US008481658B2

(12) United States Patent  (10) Patent No.: US 8,481,658 B2
Meier et al.  (45) Date of Patent: Jul. 9, 2013

(54) METHOD FOR TRANSITIONING BETWEEN INCOMPATIBLE OLEFIN POLYMERIZATION CATALYST SYSTEMS

(75) Inventors: Gerhardus Meier, Frankfurt (DE); Shahram Mihan, Bad Soden (DE)

(73) Assignee: Basell Polyolefine GmbH, Wesseling (DE)

( * ) Notice: Subject to any disclaimer, the term of this patent is extended or adjusted under 35 U.S.C. 154(b) by 184 days.

(21) Appl. No.: 13/133,803

(22) PCT Filed: Dec. 17, 2009

(86) PCT No.: PCT/EP2009/009066
§ 371 (c)(1),
(2), (4) Date: Jul. 29, 2011

(87) PCT Pub. No.: WO2010/072367
PCT Pub. Date: Jul. 1, 2010

(65) Prior Publication Data
US 2011/0294957 A1    Dec. 1, 2011

(30) Foreign Application Priority Data

Dec. 23, 2008   (EP) .................................... 08022359

(51) Int. Cl.
*C08F 255/00*   (2006.01)
*C08F 4/64*     (2006.01)
*C08F 2/34*     (2006.01)
*C08F 4/24*     (2006.01)

(52) U.S. Cl.
USPC ............... 526/86; 526/83; 526/88; 526/90; 526/92; 526/104; 526/901; 526/348; 526/160; 526/124.3; 526/142; 526/140; 525/245; 525/319

(58) Field of Classification Search
USPC ............ 526/83, 86, 88, 90, 92, 104, 901, 526/348, 160, 124.3, 142, 140; 525/245, 525/319
See application file for complete search history.

(56) References Cited

U.S. PATENT DOCUMENTS

| 5,153,157 | A | 10/1992 | Hlatky |
| 5,565,534 | A | 10/1996 | Aulbach |
| 5,672,665 | A | 9/1997 | Agapiou et al. |
| 2002/0037979 | A1* | 3/2002 | Job et al. ....................... 526/119 |
| 2004/0138391 | A1* | 7/2004 | Burdett et al. .................. 526/88 |
| 2004/0143076 | A1 | 7/2004 | Terry et al. |
| 2004/0186250 | A1 | 9/2004 | Kinnan et al. |

FOREIGN PATENT DOCUMENTS

| CA | 2084016 | 6/2004 |
| CA | 2138723 | 7/2005 |
| CA | 2099214 | 8/2005 |
| DE | 19756276 | 6/1999 |
| EP | 089691 | 9/1983 |
| EP | 0089691 | 9/1983 |
| EP | 129368 | 12/1984 |
| EP | 0475603 | 3/1992 |
| EP | 0545304 | 6/1993 |
| EP | 0561479 | 9/1993 |
| EP | 571826 | 12/1993 |
| EP | 0571826 | 12/1993 |
| EP | 0576970 | 1/1994 |
| EP | 0632063 | 1/1995 |
| EP | 0659758 | 6/1995 |
| EP | 0661300 | 7/1995 |
| EP | 416815 | 8/1997 |
| EP | 1042399 | 10/2000 |
| EP | 1182216 | 2/2002 |
| GB | 2367298 | 4/2002 |
| WO | WO-9526370 | 10/1995 |
| WO | WO-9827124 | 6/1998 |
| WO | WO-0058377 | 10/2000 |
| WO | WO-0177190 | 10/2001 |
| WO | WO-02102896 | 12/2002 |
| WO | WO-2005103100 | 11/2005 |
| WO | WO-2006069204 | 6/2006 |
| WO | WO-2007059867 | 5/2007 |
| WO | WO-2010009860 | 1/2010 |

OTHER PUBLICATIONS

Weisenfeldt, Helga, "ansa-Metallocene derivatives; XVII. Racemic and meso diastereomers of group IV metallocene derivatives with symmetrically substituted dimethylsilanediyl-bridged ligand frameworks. Crystal structure of R,S-Me2SI(3-1-Bu-5-MeC5H2)2ZrCl2", Journal of Organometallic Chemistry, 369 Elsevier Sequoia S.A., Lausanne—Printed in the Netherlands 1989, 359-370.
Benoit, H. Rempp et al., "A Universal Calibration for Gel Permeation Chromatography", Journal of Polymer Sci., Phys. Ed. 5 1967, 753-759.
Small, Brooke L. "Highly Active Iron and Cobalt Catalysts for the Polymerization of Ethylene", J.Am. Chem. Soc. 19989 1998, 4049-4050.
Britovsek, George J. "Novel olefin polymerization catalysts based on iron and cobalt", Chem. Commun. 1998 1998, 849-850.
Strauss, Steven H. "The Search for Larger and More Weakly Coordinating Anions", Chem. Rev. 1993 1993, 927-942.
Fieser, Louis "Textbook of Organic Chemistry, Third Revised Edition", Verlag Chemie-GmbH, Weinheim/Bergstr. 1957 1957, 10 pages.

* cited by examiner

Primary Examiner — Mark Kaucher

(57) ABSTRACT

A method for transitioning from a Ziegler-Natta to a Phillips catalyst system for the olefin polymerization reaction in one reactor, preferably a gas phase reactor, is described. The method comprises the steps of a) discontinuing a first olefin polymerization reaction performed in the presence of the Ziegler-Natta catalyst system; b) performing a second olefin polymerization reaction in the presence of a further catalyst system comprising catalyst components (A) and (B) producing, respectively, a first and a second polyolefin fraction, wherein the $M_w$ of the first polyolefin fraction is less than the $M_w$ of the second polyolefin fraction and the initial activity of catalyst component (A) exceeds the initial activity of catalyst component (B); and c) performing a third olefin polymerization reaction the presence of the Phillips catalyst system. Thanks to this method, there is no need to empty the reactor after each olefin polymerization reaction, and the transitioning time needed to attain the desired quality of the polyolefin obtained in each olefin polymerization reaction subsequent to the first one is sufficiently short to permit a quick and reliable change of production.

12 Claims, No Drawings

METHOD FOR TRANSITIONING BETWEEN INCOMPATIBLE OLEFIN POLYMERIZATION CATALYST SYSTEMS

This application is the U.S. national phase of International Application PCT/EP2009/009066, filed Dec. 17, 2009, claiming priority to European Application 08022359.7 filed Dec. 23, 2008 and the benefit under 35 U.S.C. 119(e) of U.S. Provisional Application No. 61/205,226, filed Jan. 20, 2009; the disclosures of International Application PCT/EP2009/009066, European Application 08022359.7 and U.S. Provisional Application No. 61/205,226, each as filed, are incorporated herein by reference.

TECHNICAL FIELD

The present invention relates to a method for transitioning between incompatible catalyst systems for the polymerization of olefins in one reactor, in particular from a Ziegler-Natta catalyst system to a Phillips catalyst system.

In the present description and in the following claims the term "catalyst system" is used to indicate a system comprising at least one catalyst component, i.e. at least one metal component catalyzing the olefin polymerization reaction, and, optionally, further components, such as an agent activating the catalyst component (also known as cocatalyst or activator), a support and any other component as is well known in the art.

As is known in the art, Ziegler-Natta catalyst systems generally comprise a complex of a base metal alkyl or halide with a transition metal salt, while Phillips catalysts generally comprise chromium oxide based catalysts.

Unless otherwise indicated, in the present description and in the following claims the term "polymerization" is used to indicate a homopolymerization or a copolymerization.

Unless otherwise indicated, in the present description and in the following claims the term "polymer" is used to indicate a homopolymer or a copolymer comprising a monomer and at least one comonomer.

The method is useful to carry out the above-mentioned transitioning in the preparation of polyolefins, particularly but not exclusively of polyethylene.

Unless otherwise indicated, in the present description and in the following claims the term "polyethylene" is used to indicate an ethylene homopolymer or a copolymer of ethylene and at least a further comonomer.

Unless otherwise indicated, in the present description and in the following claims the term "ethylene homopolymer" is used to indicate a polymer comprising repeating ethylene monomeric units, possible comonomers of different species being present in a limited amount, in any case such that the melting temperature $T_m$ of the polymer is about 125° C. or greater, wherein the melting temperature $T_m$ is the temperature at the maximum of the melting peak as better described in the following. $T_m$ is measured according to ISO 11357-3 by a first heating at a heating rate of 20° C./min until a temperature of 200° C. is reached, a dynamic crystallization at a cooling rate of 20° C./min until a temperature of −10° C. is reached, ad a second heating at a heating rate of 20° C./min until a temperature of 200° C. is reached. The melting temperature $T_m$ (maximum of the melting peak of the second heating) is therefore the temperature at which the curve of the enthalpy vs. temperature of the second heating has a maximum.

Unless otherwise indicated, in the present description and in the following claims the term "copolymer of ethylene" is used to indicate a polymer comprising repeating ethylene monomeric units and at least one further comonomer of different species, having a melting temperature $T_m$ lower than 125° C.

The above-mentioned method is particularly but not exclusively useful to carry out the above-mentioned transitioning in gas phase, preferably in a fluidized bed reactor.

BACKGROUND OF THE INVENTION AND PRIOR ART

Gas-phase olefin polymerization processes are economical processes for the polymerization of olefins. Such gas-phase polymerization processes can, in particular, be carried out in gas-phase fluidized-bed reactors in which the polymer particles are kept suspended by means of an appropriate gas stream. Processes of this type are described, for example, in European patent applications EP-A-0 475 603, EP-A-0 089 691 and EP-A-0 571 826, whose contents are hereby fully incorporated by reference.

In the production of polyolefins, in order to produce different polymer grades in the same reactor, there is the need, from time to time, to change the catalyst system. Therefore with a certain frequency, depending on the flexibility required to the reactor and on the production plans, it is necessary to use a first catalyst system to produce a first polymer and, subsequently, to use a second catalyst system to produce a second polymer. This change may not involve any substantial issue when a first catalyst system and the second catalyst system are compatible with one another, i.e. when both catalyst systems can operate under substantially the same process conditions (generally temperature, pressure, concentration of process auxiliaries, molar mass regulator, etc.) without substantially losing activity.

However, the change from a first catalyst system to a second catalyst system which is incompatible with the first catalyst system involves problems in ensuring an adequate continuity of production in terms of both quantity and quality of the product and has therefore been the subject of much effort.

In the present description and in the following claims, two catalyst systems are incompatible to each other if they respond in different ways to process conditions and/or monomers or any agents employed in the process (process auxiliaries), such as for example molecular weight regulators (for example hydrogen), comonomers or antistatic agents or any other agents, and if, due this different responsiveness, the polymers obtained by transitioning from the first catalyst system to the second catalyst system have unacceptable properties (e.g. molecular weight and/or melt flow rate and/or melt flow ratio out of the respective target value, presence of gels and fines, insufficient environmental crack resistance) or the process productivity is unacceptably low (e.g. due to chunks or sheeting in the reactor).

This definition applies to any of the components making part of the catalyst systems as defined above. So, in the present description and in the following claims, two catalyst systems are incompatible to each other if at least one component of the first catalyst system is incompatible with at least one component of the second catalyst system.

For example, a Ziegler-Natta catalyst system may be not compatible with a Phillips catalyst system because Ziegler-Natta catalyst systems generally require operating at antistatic agent concentrations (by way of illustrative example, preferably from 10 to 600 ppm) which kill the Phillips catalyst system.

A Ziegler-Natta catalyst system may be not compatible with a Phillips catalyst system because Ziegler-Natta catalyst systems generally require operating at a higher hydrogen concentration with respect to Phillips catalysts.

In order to perform a change between two incompatible catalyst systems, the most common method of the state of the art is that of stopping the first polymerization reaction by means of a deactivating agent, emptying the reactor, cleaning it and starting it up again by introducing the second catalyst system. Thus, for example, WO 00/58377 discloses a discontinuous method for changing between two incompatible catalysts, in which the first polymerization reaction is stopped, the polymer is removed from the reactor, the reactor is rapidly purged with nitrogen, a new seedbed of polymer particulates is introduced into the reactor and the second polymerization reaction is then started. However, on the one side the opening of the reactor leads to deposits on the walls which have an adverse effect on the renewed start-up of the reactor and, on the other side, such method inevitably requires a discontinuation of the polymerization process and an unacceptably long stop time between the first polymerization reaction and the second polymerization reaction.

It is also known from document WO 2006/069204 to transition from a Ziegler-Natta catalyst system to a Phillips catalyst system in a fluidized-bed reactor by adding to the reactor firstly a deactivating agent and then a cocatalyst adsorbing agent, for example silica, in order to absorb the metal alkyl before introducing the Phillips catalyst system.

Even in view of the teaching of the prior art, there is still the need to obtain an effective transitioning from Ziegler-Natta to Phillips catalyst systems.

SUMMARY OF THE INVENTION

The Applicant has perceived the need of performing an effective and smooth transition from a Ziegler-Natta catalyst system to a Phillips catalyst system in one reactor which does not jeopardize the quality of the polymers therefrom obtained, while maximizing the hour production of the reactor and minimizing the production of polymer out of target.

The Applicant has surprisingly found that, in order to obtain an effective transition between an olefin polymerization performed in the presence of a Ziegler-Natta catalyst system and an olefin polymerization performed in the presence of a Phillips catalyst system and to exploit in an effective manner the reactor, it is convenient to envisage an intermediate, further olefin polymerization in the presence of a mixed catalyst system comprising a single site catalyst component and a non-single site catalyst component.

A mixed catalyst system comprises a first catalyst component (A) and a second catalyst component (B) producing, respectively, a first and a second polyolefin fraction.

In other words, in the present description and in the following claims the term "mixed catalyst system" is used to indicate a catalyst system comprising at least two catalyst components (i.e. a plurality of different kind of active species) intended to produce respective polymer fractions having different properties, generally different molecular weights.

A single site catalyst such as a metallocene catalyst is not compatible with a Ziegler-Natta catalyst mainly because, in order to produce, for example, a polyethylene having a predetermined melt flow rate, Ziegler-Natta catalysts require operating at high hydrogen concentrations (by way of illustrative example, at a ratio of hydrogen to ethylene in the order of 1).

By way of illustrative example, single site catalysts comprise metallocene catalysts. Single-site catalysts may comprise for example compounds selected from the group of metallocenes (including cyclopentadienyl derivatives, optionally substituted with cyclic compounds), phenoxyimin derivatives, as well as neutral or charged bidentate or tridentate nitrogen ligands with 2 or 3 coordinating nitrogen atoms.

In the present description and in the following claims, the expression "metallocene catalyst" is used to indicate a catalyst component comprising at least one cyclopentadienyl transition metal complex and, generally, a compound having the following formula:

wherein Cp is a substituted or unsubstituted cyclopentadienyl ring or derivative thereof, M is a transition metal, preferably a Group 4, 5, or 6 metal, R is a hydrocarbyl group or hydrocarboxy group having from one to twenty carbon atoms, and X is a halogen. Generally, the metallocene catalyst components referenced herein include half and full sandwich compounds having one or more bulky ligands bonded to at least one metal atom. Typical metallocene catalyst components are generally described as containing one or more bulky ligand(s) and one or more leaving group(s) bonded to at least one metal atom. For the purposes of this description and appended claims, the term "leaving group" is any ligand that can be abstracted from a bulky ligand metallocene catalyst to form a metallocene catalyst cation capable of polymerizing one or more olefins.

The bulky ligands are generally represented by one or more open or fused ring(s) or ring system(s) or a combination thereof. These ring(s) or ring system(s) are typically composed of atoms selected from Groups 13 to 16 atoms, preferably the atoms are selected from the group consisting of carbon, nitrogen, oxygen, silicon, sulfur, phosphorous, boron and aluminum or a combination thereof. Most preferably the ring(s) or ring system(s) are composed of carbon atoms such as but not limited to those cyclopentadienyl ligands or cyclopentadienyl-type ligand structures or other similar functioning ligand structure such as a pentadiene, a cyclooctatetraendiyl or an imide ligand. The metal atom is preferably selected from Groups 3 through 16 and the lanthanide or actinide series of the Periodic Table of Elements. Preferably the metal is a transition metal from Groups 4 through 12, more preferably 4, 5 and 6, and most preferably the metal is from Group 4.

Single site catalysts, however, such as for example metallocene catalysts, must be operated at low hydrogen concentrations (of some centimol %, for example in the order of 0.06 mol %).

So, if Ziegler-Natta catalysts are operated at low hydrogen, they produce very high molecular weight polymers, while if metallocene catalysts are operated at low hydrogen, they produce low molecular weight polymers. Accordingly, combining the Ziegler-Natta catalyst and the metallocene catalyst and operating at low hydrogen concentration will lead to a polymer containing ultra-high molecular weight chains which, following processing, give rise to gels.

In order to ensure an effective and smooth transitioning from the Ziegler-Natta catalyst system and the Phillips catalyst system while exploiting the maximum production capacity of the reactor and ensuring the desired quality of production, it has been surprisingly found that a further olefin polymerization reaction may be performed in the presence of the above-mentioned mixed catalyst system—although the single site catalyst component of the mixed catalyst system is not compatible with the Ziegler-Natta catalyst system—provided that the further olefin polymerization reaction is performed so as to make, at the beginning of this olefin polymerization reaction, one of the two catalyst components of the mixed catalyst system more active than the other one. In this way, in fact an effective transitioning from the Ziegler-Natta catalyst system and the mixed catalyst system and from the latter to the Phillips catalyst system are both ensured.

If one of the two catalyst components of the mixed catalyst is more active for a predetermined initial time, in fact, the target properties of the polymer therefrom obtained can be attained in a short time after discontinuing the first olefin polymerization. In other words, it has been surprisingly found that by a differentiation of the relative activity of the two catalyst components of the second catalyst system for a predetermined initial time of the second polymerization reaction, an improved and more effective transitioning is achieved from the Ziegler-Natta catalyst system to the mixed catalyst system and from this to the Phillips catalyst system.

More particularly, the Applicant has surprisingly found that it may be convenient that the further polymerization reaction preferably starts with initial no activity or initial relatively lower activity of the catalyst component giving rise to the polymer fraction having the relatively higher molecular weight with respect to the activity of the catalyst component giving rise to the polymer fraction having the relatively lower molecular weight.

According to the wording of attached claims, and as described in more details in the following, this catalyst component which should be preferably inactive or in any case less active with respect to the other catalyst component at the beginning of the further polymerization reaction is the second catalyst component of the mixed catalyst system.

Furthermore, the Applicant has surprisingly found that it may be convenient that the further polymerization reaction preferably starts with initial no activation or initial relatively lower activation of the catalyst component giving rise to the polymer fraction having the relatively narrower molecular weight distribution with respect to the activity of the catalyst component giving rise to the polymer fraction having the relatively broader molecular weight distribution.

Accordingly, the present invention provides a method for transitioning from a Ziegler-Natta catalyst system to a Phillips catalyst system for the olefin polymerization in one reactor, said method comprising the steps of:
 a) discontinuing a first olefin polymerization reaction performed in the presence of the Ziegler-Natta catalyst system;
 b) performing a second olefin polymerization reaction in the presence of a further catalyst system comprising catalyst components (A) and (B) producing, respectively, a first and a second polyolefin fraction, wherein the $M_w$ of the first polyolefin fraction is less than the $M_w$ of the second polyolefin fraction and the initial activity of catalyst component (A) exceeds the initial activity of catalyst component (B);
 c) performing a third olefin polymerization reaction the presence of the Phillips catalyst system.

In the present description and following claims, $M_w$ is the "weight average molar mass" (weight average molecular weight), $M_n$ is the "number average molar mass" (number average molecular weight) and $M_w/M_n$ is the polydispersity: $M_w$ and $M_n$ are determined as defined in the detailed examples. If not otherwise indicated, the term "molecular weight" shall be understood as $M_w$.

In other words, the second polymerization reaction is initially performed so as to differentiate the relative activity between the first catalyst component (A) and the second catalyst component (B) of the mixed catalyst system, in particular so as to make the catalyst component giving rise to the polyolefin fraction having the relatively higher molecular weight (i.e. catalyst component (B)) relatively less active when compared to the activity of the catalyst component giving rise to the polyolefin fraction having the relatively lower molecular weight (i.e. catalyst component (A)) for a predetermined initial time.

In this way, a multimodal polymer in which the polymer fraction having the relatively lower molecular weight exceeds the polymer fraction having the relatively higher molecular weight (if any) is initially obtained as a result of the second polymerization reaction.

Advantageously, thanks to the combination of steps provided by the method of the invention, not only there is no need to empty the reactor, but an effective and smooth transitioning from the Ziegler-Natta catalyst system and the Phillips catalyst system while exploiting the maximum production capacity of the reactor and ensuring the desired quality of production and permitting a diversified kind of production, including monomodal and multimodal polymers.

Thanks to the provision of the second polymerization performed in the presence of the mixed catalyst system, multimodal polymers are advantageously produced in the same reactor.

As is known, monomodal polymers, which are prepared by means of catalyst systems comprising only one catalyst component, have a monomodal molecular weight distribution curve, i.e. a curve having a single peak due to the presence of a single polymer fraction having a given molecular weight, while multimodal polymers, which are for example prepared by means of mixed catalyst systems comprising at least two different catalyst components giving rise to respectively different polymers having distinct molecular weight, generally have a molecular weight distribution curve having more than one molecular weight peak due to the presence of a plurality of polymer fractions having distinct molecular weights.

Differently from the various alternative methods known to produce multimodal polymers, including post reactor or melt blending, use of multistage reactors, the catalytic polymerization in a single reactor by using a mixed catalyst system able to produce a multimodal polymer is advantageous because it allows to prepare a polymer having a good mixing quality in a single reactor by means of a single catalyst system.

With reference for example to the preferred polymer of the present invention, namely polyethylene, in the present description and in the following claims the expression "multimodal polyethylene" is used to indicate a polyethylene having at least a bimodal molecular weight distribution curve, having at least two molecular weight peaks, or at least a point of inflection on one flank of a maximum, due to the presence of at least two polymer fractions having different molecular weights. The multimodal polyethylene may also show three or more molecular weight peaks (or at least two points of inflection on one flank of a maximum), due to the presence of at least three polymer fractions having different molecular weights.

Furthermore, the transitioning time needed to attain the desired quality of the multimodal polymer prepared with the mixed catalyst system is sufficiently short to permit a quick and reliable change of production from the first, preferably monomodal polymer, i.e. the polymer obtained in the first polymerization reaction, to a multimodal polymer, i.e. the polymer obtained in the second polymerization reaction.

Furthermore, a reduction of fines is advantageously achieved with respect to other methods of transitioning from a Ziegler-Natta catalyst system to a mixed catalyst, which is particularly desirable in film applications.

Furthermore, the transitioning time needed to attain the desired quality of the polymer prepared with the Phillips catalyst system is sufficiently short to permit a quick and reliable change of production from the multimodal polymer, i.e. the polymer obtained in the second polymerization reaction, to a preferably monomodal polymer, i.e. the polymer obtained in the third polymerization reaction.

The above-mentioned steps a), b) and c) of the method of the invention are preferably performed in a continuous manner, i.e. without any intermediate step therebetween, and in particular without any step of emptying reactor. Advantageously, with reference for example to a preferred embodiment in which a fluidized bed reactor is used, there is no need to empty the reactor and to fill the reactor again with fresh polymer powder in order to form a new bed each time the catalyst system is changed.

Preferably, the second polymerization reaction is performed so as to make the catalyst component giving rise to the polymer fraction having the relatively narrower molecular weight distribution relatively less active when compared to the activity of the catalyst component giving rise to the polymer fraction having the relatively broader molecular weight distribution for a predetermined initial time.

The first, the second and the third polymer are polyolefins, preferably polyethylene or polypropylene. Preferably, each of the three polyolefins is polyethylene. Preferably, both the at least one first and the at least one second polymer fractions of the second polymer are ethylene polymer fractions.

Either of the three polymers prepared in the three olefin polymerization reactions is preferably polyethylene, preferably a copolymer of ethylene and at least one comonomer, preferably an alpha-olefin. Preferred alpha-olefins comprise olefins having from 3 to 12 carbon atoms, preferably from 3 to 10 carbon atoms, e.g. propene, 1-butene, 1-pentene, 1-hexene, 4-methyl-1-pentene, 1-heptene, 1-octene, 1-decene. Particularly preferred comonomers comprise 1-butene, 1-pentene, 1-hexene, 4-methyl-1-pentene, 1-octene, and, still more preferably, 1-butene, 1-hexene, 1-octene.

Even if the following considerations will refer to the homopolymerization of ethylene or to the copolymerization of ethylene with at least one comonomer as preferred embodiment, it is intended that they apply to any kind of polymerization of olefins as well.

The reactor is preferably a gas phase reactor, preferably a continuous gas phase reactor, in particular a gas-phase fluidized-bed reactor. However, the method of the invention may be applied also in other phase or reactors, such as for example in bulk, in suspension or in a supercritical medium in any of the conventional reactors used for the polymerization of olefins. In other words, solution processes, suspension processes, stirred gas-phase processes and gas-phase fluidized-bed processes are all possible.

Preferably, the Ziegler-Natta catalyst system comprises a catalyst component and an agent activating the catalyst component (cocatalyst).

Preferably, the Ziegler-Natta catalyst system comprises only one catalyst component, i.e. a catalyst component having only one active catalyst component, which is intended to prepare a monomodal polymer.

According to a preferred embodiment, the Ziegler-Natta catalyst system comprises at least one Ziegler-Natta catalyst component, for example one or two Ziegler-Natta catalyst components. Preferably, the Ziegler-Natta catalyst system comprises one Ziegler-Natta catalyst component.

Preferably, the Ziegler-Natta catalyst system comprises a Ziegler-Natta catalyst component and, additionally, an agent activating the Ziegler-Natta catalyst component.

Preferably, the agent activating the Ziegler-Natta catalyst component comprises an organometallic compound, preferably an organometallic compound, preferably an organometallic compound of a metal of Group 1, 2 or 3. Preferably, the first activating agent is selected from the group comprising, preferably consisting of: organometallic alkyls, alkoxides, and halides.

Preferred organometallic compounds comprise lithium alkyls, magnesium or zinc alkyls, magnesium alkyl halides, aluminum alkyls, silicon alkyls, silicon alkoxides and silicon alkyl halides. More preferably, the organometallic compounds comprise aluminum alkyls and magnesium alkyls. Still more preferably, the organometallic compounds comprise aluminum alkyls, preferably trialkylaluminum compounds. Preferably, the aluminum alkyls comprise, for example, trimethylaluminum (TMAL), triethylaluminum (TEAL), tri-isobutylaluminum (TIBAL) and tri-n-hexylaluminum (TNHAL) and the like.

Preferably, the mixed catalyst system comprises a single site catalyst component and a non-single site catalyst component.

In the present description and in the following claims, the expression "single site catalyst component" is used to indicate a catalyst component comprising a coordination metal complex capable of polymerizing a monomer, particularly an olefin monomer, preferably ethylene, and optionally at least one comonomer, preferably an alpha-olefin, so as to obtain a polyolefin, respectively a polyethylene, having a narrow molecular weight distribution.

In the present description and in the following claims, a polyolefin, preferably polyethylene, has a narrow molecular weight distribution when the polyolefin, respectively polyethylene, has a polydispersity $M_w/M_n$ lower than or equal to 5, preferably in the range from 1.5 to 5, more preferably from 1.5 to 3, still more preferably from 2 to 3.

In the present description and in the following claims, the expression "non-single site catalyst component" is used to indicate a catalyst component giving rise to a polyolefin having a polydispersity higher than 5. By way of illustrative example, transition metal coordination compounds including at least one ligand of the non-metallocene type, Ziegler-Natta catalysts and Phillips catalysts may be considered as examples of non-single site catalysts.

Preferably, the mixed catalyst system comprises a late transition metal catalyst component including at least one ligand of the non-metallocene type and a single site catalyst component, preferably a metallocene catalyst component.

Preferably, the mixed catalyst system comprises, as first catalyst component, a late transition metal catalyst component for olefin polymers by coordination polymerization, more preferably based on groups 8-10 of the Periodic Table of Elements, still more preferably selected from the group comprising, preferably consisting of Fe, Ni, Pd, Co.

Preferably, the first catalyst component of the mixed catalyst preferably comprises an iron catalyst component, preferably having a tridentate ligand bearing at least two ortho, ortho-disubstituted aryl radicals.

Preferred iron catalyst components may be the iron catalyst components described in patent application WO 2005/103100.

Preferred iron catalyst components are transition metal complexes with at least one ligand of the following general formula (I):

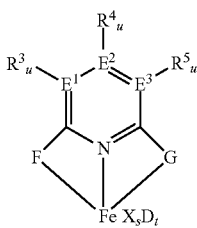

(I)

wherein the variables have the following meaning:

F and G, independently of one another, are selected from the group comprising, preferably consisting of:

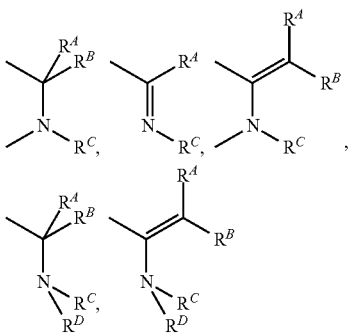

$R^3$-$R^5$ independently of one another denote hydrogen, $C_1$-$C_{22}$-alkyl, $C_2$-$C_{22}$-alkenyl, $C_6$-$C_{22}$-aryl, arylalkyl having 1 to 10 C atoms in the alkyl radical and 6 to 20 C atoms in the aryl radical, $NR^{12A}_2$, $OR^{12A}$, halogen, $SiR^{11A}_3$ or five-, six- or seven-membered heterocyclyl, which comprises at least one atom from the group consisting of N, P, O or S, wherein the organic radicals $R^{3A}$-$R^{10A}$ can also be substituted by halogens, $NR^{12A}_2$, $OR^{12A}$ or $SiR^{11A}_3$ and/or in each case two radicals $R^{3A}$-$R^{5A}$ and/or in each case two radicals $R^{6A}$-$R^{10A}$ can also be bonded with one another to form a five-, six- or seven-membered ring and/or in each case two radicals $R^{3A}$-$R^{5A}$ and/or in each case two radicals $R^{6A}$-$R^{10A}$ are bonded with one another to form a five-, six- or seven-membered heterocyclyl, which comprises at least one atom from the group consisting of N, P, O or S, $R^{11A}$ independently of one another denote hydrogen, $C_1$-$C_{22}$-alkyl, $C_2$-$C_{22}$-alkenyl, $C_6$-$C_{22}$-aryl, arylalkyl having 1 to 10 C atoms in the alkyl radical and 6 to 20 C atoms in the aryl radical, and/or two radicals $R^{11A}$ can also be bonded with one another to form a five- or six-membered ring, $R^{12A}$ independently of one another denote hydrogen, $C_1$-$C_{22}$-alkyl, $C_2$-$C_{22}$-alkenyl, $C_6$-$C_{22}$-aryl, arylalkyl having 1 to 10 C atoms in the alkyl radical and 6 to 20 C atoms in the aryl radical, or $SiR^{11A}_3$, wherein the organic radicals $R^{12A}$ can also be substituted by halogens, and/or in each case two radicals $R^{12A}$ can also be bonded with one another to form a five- or six-membered ring, $R^A$,$R^B$ independently of one another denote hydrogen, $C_1$-$C_{20}$-alkyl, $C_2$-$C_{20}$-alkenyl, $C_6$-$C_{20}$-aryl, arylalkyl having 1 to 10 C atoms in the alkyl radical and 6 to 20 C atoms in the aryl radical, or $SiR^{11A}_3$, wherein the organic radicals $R^A$,$R^B$ can also be substituted by halogens, and/or in each case two radicals $R^A$,$R^B$ can also be bonded with one another to form a five- or six-membered ring, $R^C$,$R^D$ independently of one another denote hydrogen, $C_1$-$C_{20}$-alkyl, $C_2$-$C_{20}$-alkenyl, $C_6$-$C_{20}$-aryl, arylalkyl having 1 to 10 C atoms in the alkyl radical and 6 to 20 C atoms in the aryl radical, or $SiR^{11A}_3$, wherein the organic radicals $R^C$,$R^D$ can also be substituted by halogens, and/or in each case two radicals $R^C$,$R^D$ can also be bonded with one another to form a five- or six-membered ring, $E^1$-$E^3$ independently of one another denote carbon or nitrogen, u independently of one another are 0 for $E^1$-$E^3$ as nitrogen and 1 for $E^1$-$E^3$ as carbon, X independently of one another denote fluorine, chlorine, bromine, iodine, hydrogen, $C_1$-$C_{10}$-alkyl, $C_2$-$C_{10}$-alkenyl, $C_6$-$C_{20}$-aryl, arylalkyl having 1-10 C atoms in the alkyl radical and 6 to 20 C atoms in the aryl radical, $NR^{13A}_2$, $OR^{13A}$, $SR^{13A}$, $SO_3R^{13A}$, $OC(O)R^{13A}$, CN, SCN, β-diketonate, CO, $BF_4^-$, $PF_6^-$ or bulky non-coordinating anions, wherein the organic radicals $X^A$ can also be substituted by halogens and/or at least one radical $R^{13A}$, and the radicals X are optionally bonded with one another, $R^{13A}$ independently of one another denote hydrogen, $C_1$-$C_{22}$-alkyl, $C_2$-$C_{22}$-alkenyl, $C_6$-$C_{22}$-aryl, arylalkyl having 1 to 10 C atoms in the alkyl radical and 6 to 20 C atoms in the aryl radical, or $SiR^{14A}_3$, wherein the organic radicals $R^{13A}$ can also be substituted by halogens, and/or in each case two radicals $R^{13A}$ can also be bonded with one another to form a five- or six-membered ring, $R^{14A}$ independently of one another denote hydrogen, $C_1$-$C_{20}$-alkyl, $C_2$-$C_{20}$-alkenyl, $C_6$-$C_{20}$-aryl, arylalkyl having 1 to 10 C atoms in the alkyl radical and 6 to 20 C atoms in the aryl radical, wherein the organic radicals $R^{14A}$ can also be substituted by halogens, and/or in each case two radicals $R^{14A}$ can also be bonded with one another to form a five- or six-membered ring, s is 1, 2, 3 or 4, t is 0 to 4.

According to a preferred embodiment, the at least one iron catalyst is of formula (II):

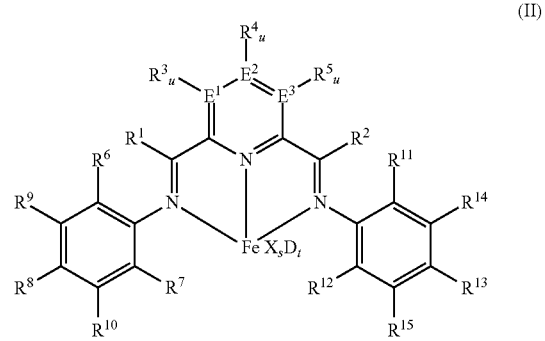

(II)

wherein the variables have the following meaning:

$R^1$-$R^2$ independently of one another denote hydrogen, $C_1$-$C_{22}$-alkyl, $C_2$-$C_{22}$-alkenyl, $C_6$-$C_{22}$-aryl, arylalkyl having 1 to 10 C atoms in the alkyl radical and 6-20 C atoms in the aryl radical, or five-, six- or seven-membered heterocyclyl, which comprises at least one atom from the group consisting of N, P, O or S, wherein the organic radicals $R^1$-$R^2$ can also be substituted by halogens, $NR^{16}_2$, $OR^{16}$ or $SiR^{17}_3$ and/or the two radicals $R^1$-$R^2$ can also be bonded with $R^3$-$R^5$ to form a five-, six- or seven-membered ring, $R^3$-$R^{15}$ independently of one another denote hydrogen, $C_1$-$C_{22}$-alkyl, $C_2$-$C_{22}$-alkenyl, $C_6$-$C_{22}$-aryl, arylalkyl having 1 to 10 C atoms in the alkyl radical and 6-20 C atoms in the aryl radical, $NR^{16}_2$, $OR^{16}$, halogen, $SiR^{17}_3$ or five-, six- or seven-membered heterocyclyl, which comprises at least one atom from the group consisting of N, P, O or S, wherein the organic radicals $R^3$-$R^{15}$ can also be substituted by halogens, $NR^{16}{}_2$, $OR^{16}$ or $SiR^{17}{}_3$ and/or in each case two radicals $R^3$-$R^5$ can be bonded with one another and/or in each case two radicals $R^6$-$R^{10}$ can also be bonded with one another to form a five-, six- or seven-membered ring and/or in each case two radicals $R^{11}$-$R^{15}$ can also be bonded with one another to form a five-, six- or seven-membered ring, and/or in each case two radicals $R^3$-$R^5$ are bonded with one another and/or in each case two radicals $R^6$-$R^{10}$ are bonded with one another to form a five-, six- or seven-membered heterocyclyl and/or in each case two radicals $R^{11}$-$R^{15}$ are bonded with one another to form a five-, six- or seven-membered heterocyclyl, which comprises at least one atom from the group consisting of N, P, O or S, wherein at least one of the radicals $R^6$-$R^{15}$ is chlorine, bromine, iodine, $CF_3$ or $OR^{11}$, wherein at least one radical R of the group consisting of $R^6$-$R^8$, and $R^{11}$-$R^{13}$ is chlorine, bromine, iodine, $CF_3$ or $OR^{11}$, $R^{16}$ independently of one another denote hydrogen, $C_1$-$C_{22}$-alkyl, $C_2$-$C_{22}$-alkenyl, $C_6$-$C_{22}$-aryl, arylalkyl having 1 to 10 C atoms in the alkyl radical and 6-20 C atoms in the aryl radical or $SiR^{17}{}_3$, wherein the organic radicals $R^{16}$ can also be substituted by halogens and in each case two radicals $R^{16}$ can also be bonded to form a five- or six-membered ring, $R^{17}$ independently of one another denote hydrogen, $C_1$-$C_{22}$-alkyl, $C_2$-$C_{22}$-alkenyl, $C_6$-$C_{22}$-aryl or arylalkyl having 1 to 10 C atoms in the alkyl radical and 6-20 C atoms in the aryl radical and in each case two radicals $R^{17}$ can also be bonded to form a five- or six-membered ring, $E^1$-$E^3$ independently of one another denote carbon, nitrogen or phosphorus, in particular carbon, and u independently of one another is 0 for $E^1$-$E^3$ as nitrogen or phosphorus and 1 for $E^1$-$E^3$ as carbon, X independently of one another denote fluorine, chlorine, bromine, iodine, hydrogen, $C_1$-$C_{10}$-alkyl, $C_2$-$C_{10}$-alkenyl, $C_6$-$C_{20}$-aryl, arylalkyl having 1-10 C atoms in the alkyl radical and 6-20 C atoms in the aryl radical, wherein the organic radicals X can also be substituted by $R^{18}$, $NR^{18}{}_2$, $OR^{18}$, $SR^{18}$, $SO_3R^{18}$, $OC(O)R^{18}$, CN, SCN, β-diketonate, CO, $BF_4{}^-$, $PF_6{}^-$ or bulky non-coordinating anions and the radicals X are if appropriate bonded with one another, $R^{18}$ independently of one another denote hydrogen, $C_1$-$C_{20}$-alkyl, $C_2$-$C_{20}$-alkenyl, $C_6$-$C_{20}$-aryl, arylalkyl having 1 to 10 C atoms in the alkyl radical and 6-20 C atoms in the aryl radical or $SiR^{19}{}_3$, wherein the organic radicals $R^{18}$ can also be substituted by halogens or nitrogen- and oxygen-containing groups and in each case two radicals $R^{18}$ can also be bonded to form a five- or six-membered ring, $R^{19}$ independently of one another denote hydrogen, $C_1$-$C_{20}$-alkyl, $C_2$-$C_{20}$-alkenyl, $C_6$-$C_{20}$-aryl or arylalkyl having 1 to 10 C atoms in the alkyl radical and 6-20 C atoms in the aryl radical, wherein the organic radicals $R^{19}$ can also be substituted by halogens or nitrogen- and oxygen-containing groups and in each case two radicals $R^{19}$ can also be bonded to form a five- or six-membered ring, s is 1, 2, 3 or 4, in particular 2 or 3, D is a neutral donor and t is 0 to 4, in particular 0, 1 or 2.

Preferably, at least one radical R of the group consisting of $R^6$-$R^8$ and $R^{11}$-$R^{13}$ is chlorine, bromine, iodine, $CF^3$ or $OR^{11}$.

The three atoms $E^1$-$E^3$ in a molecule can be identical or different. If $E^1$ is phosphorus, then $E^2$ to $E^3$ are preferably each carbon. If $E^1$ is nitrogen, then $E^2$ and $E^3$ are each preferably nitrogen or carbon, in particular carbon.

u independently of one another is 0 for $E^1$-$E^3$ as nitrogen or phosphorus and 1 for $E^1$-$E^3$ as carbon.

$R^1$-$R^2$ can be varied within a wide range. Possible carboorganic substituents $R^1$-$R^2$ are, for example, the following: $C_1$-$C_{22}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_1$-$C_{10}$-alkyl group and/or $C_6$-$C_{10}$-aryl group as substituents, e.g. cyclopropyl, cyclobutyl, cyclopentyl, cyclohexyl, cycloheptyl, cyclooctyl, cyclononyl or cyclododecyl, $C_2$-$C_{22}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which may be substituted by further alkyl groups, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl which may be substituted by further alkyl groups, e.g. benzyl, o-, m-, p-methylbenzyl, 1- or 2-ethylphenyl, where two radicals $R^1$-$R^2$ may also be joined to form a 5-, 6- or 7-membered ring and/or two of the vicinal radicals $R^1$-$R^2$ may be joined to form a five-, six- or seven-membered heterocycle containing at least one atom from the group consisting of N, P, O and S and/or the organic radicals $R^1$-$R^2$ may also be substituted by halogens such as fluorine, chlorine or bromine. Furthermore, $R^3$-$R^{15}$ can also be amino $NR^{16}{}_2$ or $SiR^{17}{}_3$, alkoxy or aryloxy $OR^{16}$, for example dimethylamino, N-pyrrolidinyl, picolinyl, methoxy, ethoxy or isopropoxy or halogen such as fluorine, chlorine or bromine. Further possible radicals $R^{16}$ and $R^{17}$ are more fully described below. Two $R^{16}$ and/or $R^{17}$ may also be joined to form a 5- or 6-membered ring. The $SiR^{17}{}_3$ radicals may also be bound to $E^1$-$E^3$ via an oxygen or nitrogen. Examples for $R^{17}$ are trimethylsilyloxy, triethylsilyloxy, butyldimethylsilyloxy, tributylsilyloxy or tri-tert-butylsilyloxy.

The substituents $R^3$-$R^{15}$ can be varied within a wide range, as long as at least one radical R of $R^6$-$R^{15}$ is chlorine, bromine, and iodine, $CF_3$ or $OR^{11}$. Possible carboorganic substituents $R^3$-$R^{15}$ are, for example, the following: $C_1$-$C_{22}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_1$-$C_{10}$-alkyl group and/or $C_6$-$C_{10}$-aryl group as substituents, e.g. cyclopropyl, cyclobutyl, cyclopentyl, cyclohexyl, cycloheptyl, cyclooctyl, cyclononyl or cyclododecyl, $C_2$-$C_{22}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which may be substituted by further alkyl groups, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl which may be substituted by further alkyl groups, e.g. benzyl, o-, m-, p-methylbenzyl, 1- or 2-ethylphenyl, where two radicals $R^3$-$R^5$ and/or two vicinal radicals $R^6$-$R^{15}$ may also be joined to form a 5-, 6- or 7-membered ring and/or two of the vicinal radicals $R^3$-$R^5$ and/or two of the vicinal radicals $R^6$-$R^{15}$ may be joined to form a five-, six- or seven-membered heterocycle containing at least one atom from the group consisting of N, P, O and S and/or the organic radicals $R^3$-$R^5$ and/or $R^6$-$R^{15}$ may also be substituted by halogens such as fluorine, chlorine or bromine. Furthermore, $R^3$-$R^{15}$ can also be amino $NR^{16}{}_2$ or $SiR^{17}{}_3$, alkoxy or aryloxy $OR^{16}$, for example dimethylamino, N-pyrrolidinyl, picolinyl, methoxy, ethoxy or isopropoxy or halogen such as fluorine, chlorine or bromine. Further possible radicals $R^{16}$ and $R^{17}$ are more fully described below. Two $R^{16}$ and/or $R^{17}$ may also be joined to form a 5- or 6-membered ring. The $SiR^{17}_3$ radicals may also be bound to $E^1$-$E^3$ via an oxygen or nitrogen. Examples for $R^{17}$ are trimethylsilyloxy, triethylsilyloxy, butyldimethylsilyloxy, tributylsilyloxy or tri-tert-butylsilyloxy.

Preferred radicals $R^3$-$R^5$ are hydrogen, methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, ortho-dialkyl- or -dichloro-substituted phenyls, trialkyl- or trichloro-substituted phenyls, naphthyl, biphenyl and anthranyl. Particularly preferred organosilicon substituents are trialkylsilyl groups having from 1 to 10 carbon atoms in the alkyl radical, in particular trimethylsilyl groups.

Preferred radicals $R^6$-$R^{15}$ are hydrogen, methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine and bromine, wherein at least one of the radicals $R^6$-$R^{15}$ is chlorine, bromine, iodine, $CF_3$ or $OR^{11}$.

Preferably, at least one radical R of the group consisting of $R^6$-$R^8$, and $R^{11}$-$R^{13}$ is chlorine, bromine, or $CF_3$ and at least one radical R of the group consisting of $R^6$-$R^8$, and $R^{11}$-$R^{13}$ is hydrogen, or $C_1$-$C_4$-alkyl, wherein the alkyl can be linear or branched, in particular, methyl, ethyl, n-propyl, iso-propyl, n-butyl, iso-butyl, or tert.-butyl.

In particular, at least one radical R of the group consisting of $R^6$-$R^8$, and $R^{11}$-$R^{13}$ is chlorine or bromine and at least one radical R of the group consisting of $R^6$-$R^8$, and $R^{11}$-$R^{13}$ is hydrogen, or methyl.

Preferably, $R^6$ and/or $R^{11}$ are chlorine or bromine and $R^7$, $R^8$, $R^{12}$ and/or $R^{13}$ are hydrogen, or methyl. In another preferred embodiment of the invention, $R^6$ and $R^8$, and/or $R^{11}$ and $R^{13}$ are chlorine or bromine, and $R^7$ and/or $R^{12}$, are hydrogen or methyl. In a further preferred embodiment $R^6$ and $R^{11}$ are identical, and/or $R^7$ and $R^{12}$ are identical, and/or $R^8$ and $R^{13}$ are identical, wherein at least one pair of identical rests R is chlorine or bromine. In another preferred embodiment $R^6$ and $R^{11}$ are different, and/or $R^7$ and $R^{12}$ are different, and/or $R^8$ and $R^{13}$ are different, wherein at least rest R is chlorine or bromine. Particular preference is given to iron components in which at least one rest R $R^6$-$R^8$, and/or $R^{11}$-$R^{13}$ is chlorine.

In particular, at least one radical R of the group consisting of $R^9$, $R^{10}$, $R^{14}$ and $R^{15}$ is hydrogen, or $C_1$-$C_{22}$-alkyl which may also be substituted by halogens, e.g. methyl, trifluoromethyl, ethyl, n-propyl, n-butyl, n-pentyl, n-hexyl, n-heptyl, n-octyl, or vinyl. Particular preference is given to $R^9$, $R^{10}$, $R^{14}$, and $R^{15}$ being hydrogen, or methyl, ethyl, n-propyl, n-butyl, preferably hydrogen. Especially, $R^9$, $R^{10}$, $R^{14}$, and $R^{15}$ are identical.

Variation of the radicals $R^{16}$ enables, for example, physical properties such as solubility to be finely adjusted. Possible carboorganic substituents $R^{16}$ are, for example, the following: $C_1$-$C_{20}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_6$-$C_{10}$-aryl group as substituent, e.g. cyclopropyl, cyclobutyl, cyclopentyl, cyclohexyl, cycloheptyl, cyclooctyl, cyclononyl or cyclododecyl, $C_2$-$C_{20}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{20}$-aryl which may be substituted by further alkyl groups and/or N- or O-containing radicals, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, 2-methoxyphenyl, 2-N,N-dimethylaminophenyl, or arylalkyl which may be substituted by further alkyl groups, e.g. benzyl, o-, m-, p-methylbenzyl, 1- or 2-ethylphenyl, where two radicals $R^{16}$ may also be joined to form a 5- or 6-membered ring and the organic radicals $R^{16}$ may also be substituted by halogens such as fluorine, chlorine or bromine.

Possible radicals $R^{17}$ in organosilicon substituents $SiR^{17}_3$ are the same radicals which have been described above for $R^1$-$R^2$, where two radicals $R^{17}$ may also be joined to form a 5- or 6-membered ring, e.g. trimethylsilyl, triethylsilyl, butyldimethylsilyl, tributylsilyl, triallylsilyl, triphenylsilyl or dimethylphenylsilyl. Preference is given to using $C_1$-$C_{10}$-alkyl such as methyl, ethyl, n-propyl, n-butyl, tert-butyl, n-pentyl, n-hexyl, n-heptyl, n-octyl, and also vinyl allyl, benzyl and phenyl as radicals $R^{17}$.

The ligands X result, for example, from the choice of the appropriate starting metal compounds used for the synthesis of the iron catalyst component, but can also be varied afterward. Possible ligands X are, in particular, the halogens such as fluorine, chlorine, bromine or iodine, in particular chlorine. Alkyl radicals such as methyl, ethyl, propyl, butyl, vinyl, allyl, phenyl or benzyl are also usable ligands X, wherein the organic radicals X can also be substituted by $R^{18}$. As further ligands X, mention may be made, purely by way of example and in no way exhaustively, of trifluoroacetate, $BF_4^-$, $PF_6^-$ and weakly coordinating or non-coordinating anions (cf., for example, S. Strauss in Chem. Rev. 1993, 93, 927-942), e.g. $B(C_6F_5)_4^-$. Amides, alkoxides, sulfonates, carboxylates and β-diketonates are also particularly useful ligands X. Some of these substituted ligands X are particularly preferably used since they are obtainable from cheap and readily available starting materials. Thus, a particularly preferred embodiment is that in which X is dimethylamide, methoxide, ethoxide, isopropoxide, phenoxide, naphthoxide, triflate, p-toluenesulfonate, acetate or acetylacetonate.

The number s of the ligands X depends on the oxidation state of the iron. The number s can thus not be given in general terms. The oxidation state of the iron in catalytically active complexes is usually known to those skilled in the art. However, it is also possible to use complexes whose oxidation state does not correspond to that of the active catalyst. Such complexes can then be appropriately reduced or oxidized by means of suitable activators. Preference is given to using iron complexes in the oxidation state +3 or +2.

D is an uncharged donor, in particular an uncharged Lewis base or Lewis acid, for example amines, alcohols, ethers, ketones, aldehydes, esters, sulfides or phosphines which may be bound to the iron centre or else still be present as residual solvent from the preparation of the iron catalyst components.

The number t of the ligands D can be from 0 to 4 and is often dependent on the solvent in which the iron complex is prepared and the time for which the resulting complexes are dried and can therefore also be a non-integer number such as 0.5 or 1.5. In particular, t is 0, 1 to 2.

Preferred iron catalyst components of formula (II) are 2,6-bis[1-(2-chloro-4,6-dimethylphenylimino)ethyl]pyridine iron(II) chloride; 2,6-bis[1-(2-chloro-6-methyl-phenylimino)ethyl]pyridine iron(II) dichloride, 2,6-bis[1-(2,6-dichlorophenylimino)ethyl]pyridine iron(II) dichloride, 2,6-bis[1-(2,4-dichloro-6-methyl-phenylimino)ethyl]pyridine iron(II) dichloride, 2,6-bis[1-(2,6-difluorophenylimino) ethyl]-pyridine iron(II) dichloride, 2,6-bis[1-(2,6-dibromophenylimino)ethyl]-pyridine iron(II) dichloride or the respective dibromides or tribromides.

The preparation of the iron complexes is described, for example, in J. Am. Chem. Soc. 120, p. 4049 ff. (1998), J. Chem. Soc., Chem. Commun. 1998, 849, and WO 98/27124.

Preferably, the mixed catalyst system comprises, as second catalyst component, early transition metal catalyst for olefin polymers by coordination polymerization, more preferably catalysts based on groups 4-6 of the Periodic Table of Elements, still more preferably selected from the group consisting of Ti, V, Cr, Zr, Hf.

Preferably, the second catalyst component of the mixed catalyst system comprises a monocyclopentadienyl complex of a metal of groups 4-6 of the Periodic Table of Elements, whose cyclopentadienyl system is preferably substituted by an uncharged donor or a hafnocene.

For the purposes of the present invention, an uncharged donor is an uncharged functional group containing an element of group 15 or 16 of the Periodic Table. Examples of cyclopentadienyl complexes are described in patent application WO2005/103100.

Preferred single site catalyst components suitable as second catalyst components of the mixed catalyst system may be polymerization catalysts based on a monocyclopentadienyl complex of a metal of groups 4-6 of the Periodic Table of Elements, preferably hafnocene catalyst components such as, for example, cyclopentadienyl complexes. The cyclopentadienyl complexes can be, for example, bridged or unbridged biscyclopentadienyl complexes as described, for example, in EP 129 368, EP 561 479, EP 545 304 and EP 576 970, monocyclopentadienyl complexes such as bridged amidocyclopentadienyl complexes described, for example, in EP 416 815, multinuclear cyclopentadienyl complexes as described in EP 632 063, pi-ligand-substituted tetrahydropentalenes as described in EP 659 758 or pi-ligand-substituted tetrahydroindenes as described in EP 661 300.

Particularly preferred hafnocenes are hafnium complexes of the following general formula:

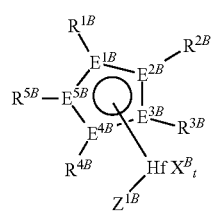

(III)

where the substituents and indices have the following meanings:

$X^B$ is fluorine, chlorine, bromine, iodine, hydrogen, $C_1$-$C_{10}$-alkyl, $C_2$-$C_{10}$-alkenyl, $C_6$-$C_{15}$-aryl, alkylaryl having from 1 to 10 carbon atoms in the alkyl part and from 6 to 20 carbon atoms in the aryl part, —$OR^{6B}$ or —$NR^{6B}R^{7B}$, or two radicals $X^B$ form a substituted or unsubstituted diene ligand, in particular a 1,3-diene ligand, and the radicals $X^B$ are identical or different and may be joined to one another, $E^{1B}$-$E^{5B}$ are each carbon or not more than one $E^{1B}$ to $E^{5B}$ is phosphorus or nitrogen, preferably carbon, t is 1, 2 or 3 and is, depending on the valence of Hf, such that the metallocene complex of the general formula (I) is uncharged, where $R^{6B}$ and $R^{7B}$ are each $C_1$-$C_{10}$-alkyl, $C_6$-$C_{15}$-aryl, alkylaryl, arylalkyl, fluoroalkyl or fluoroaryl each having from 1 to 10 carbon atoms in the alkyl part and from 6 to 20 carbon atoms in the aryl part and $R^{1B}$ to $R^{5B}$ are each, independently of one another hydrogen, $C_1$-$C_{22}$-alkyl, 5- to 7-membered cycloalkyl or cycloalkenyl which may in turn bear $C_1$-$C_{10}$-alkyl groups as substituents, $C_2$-$C_{22}$-alkenyl, $C_6$-$C_{22}$-aryl, arylalkyl having from 1 to 16 carbon atoms in the alkyl part and from 6 to 21 carbon atoms in the aryl part, $NR^{8B}_2$, $N(SiR^{8B}_3)_2$, $OR^{8B}$, $OSiR^{8B}_3$, $SiR^{8B}_3$, where the organic radicals $R^{1B}$-$R^{5B}$ may also be substituted by halogens and/or two radicals $R^{1B}$-$R^{5B}$, in particular vicinal radicals, may also be joined to form a five-, six- or seven-membered ring, and/or two vicinal radicals $R^{1D}$-$R^{5D}$ may be joined to form a five-, six- or seven-membered heterocycle containing at least one atom from the group consisting of N, P, O and S, where the radicals $R^{8B}$ can be identical or different and can each be $C_1$-$C_{10}$-alkyl, $C_3$-$C_{10}$-cycloalkyl, $C_6$-$C_{15}$-aryl, $C_1$-$C_4$-alkoxy or $C_6$-$C_{10}$-aryloxy and $Z^{1B}$ is $X^B X$ or

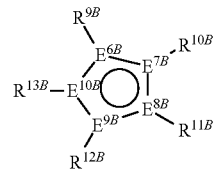

(IV)

where the radicals $R^{9B}$ to $R^{13B}$ are each, independently of one another, hydrogen, $C_1$-$C_{22}$-alkyl, 5- to 7-membered cycloalkyl or cycloalkenyl which may in turn bear $C_1$-$C_{10}$-alkyl groups as substituents, $C_2$-$C_{22}$-alkenyl, $C_6$-$C_{22}$-aryl, arylalkyl having from 1 to 16 carbon atoms in the alkyl part and 6-21 carbon atoms in the aryl part, $NR^{14B}_2$, $N(SiR^{14B}_3)_2$, $OR^{14B}$, $OSiR^{14B}_3$, $SIR^{14B}_3$, where the organic radicals $R^{9B}$-$R^{13B}$ may also be substituted by halogens and/or two radicals $R^{9B}$-$R^{13B}$, in particular vicinal radicals, may also be joined to form a five-, six- or seven-membered ring, and/or two vicinal radicals $R^{9B}$-$R^{13B}$ may be joined to form a five-, six- or seven-membered heterocycle containing at least one atom from the group consisting of N, P, O and S, where the radicals $R^{14B}$ are identical or different and are each $C_1$-$C_{10}$-alkyl, $C_3$-$C_{10}$-cycloalkyl, $C_6$-$C_{15}$-aryl, $C_1$-$C_4$-alkoxy or $C_6$-$C_{10}$-aryloxy, $E^{6B}$-$E^{10B}$ are each carbon or not more than one $E^{6B}$ to $E^{10B}$ is phosphorus or nitrogen, preferably carbon, or where the radicals $R^{4B}$ and $Z^{1B}$ together form an -$R^{15B}_v$-$A^{1B}$- group, where $R^{15B}$ is

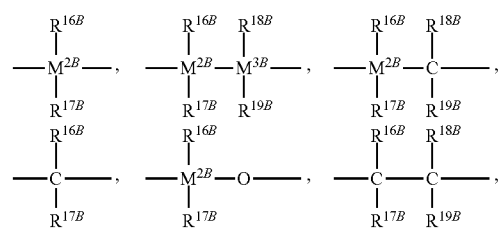

-continued

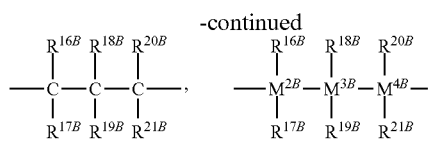

$=BR^{16B}$, $=BNR^{16B}R^{17B}$, $=AlR^{16B}$, —Ge—, —Sn—, —O—, —S—, $=SO$, $=SO_2$, $=NR^{16B}$, $=CO$, $=PR^{16B}$ or $=P(O)R^{16B}$, where $R^{16B}$-$R^{21B}$ are identical or different and are each a hydrogen atom, a halogen atom, a trimethylsilyl group, a $C_1$-$C_{10}$-alkyl group, a $C_1$-$C_{10}$-fluoroalkyl group, a $C_6$-$C_{10}$-fluoroaryl group, a $C_6$-$C_{10}$-aryl group, a $C_1$-$C_{10}$-alkoxy group, a $C_7$-$C_{15}$-alkylaryloxy group, a $C_2$-$C_{10}$-alkenyl group, a $C_7$-$C_{40}$-arylalkyl group, a $C_8$-$C_{40}$-arylalkenyl group or a $C_7$-$C_{40}$-alkylaryl group or two adjacent radicals together with the atoms connecting them form a saturated or unsaturated ring having from 4 to 15 carbon atoms, and $M^{2B}$-$M^{4B}$ are each silicon, germanium or tin, or preferably silicon, $A^{1B}$ is —O—, —S—

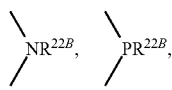

$=O$, $=S$, $=NR^{22B}$, —O—$R^{22B}$, —$NR^{22B}_2$, —$PR^{22B}_2$ or an unsubstituted, substituted or fused, heterocyclic ring system, where the radicals $R^{22B}$ are each, independently of one another, $C_1$-$C_{10}$-alkyl, $C_6$-$C_{15}$-aryl, $C_3$-$C_{10}$-cycloalkyl, $C_7$-$C_{18}$-alkylaryl or $Si(R^{23B})_3$, $R^{23B}$ is hydrogen, $C_1$-$C_{10}$-alkyl, $C_6$-$C_{15}$-aryl which may in turn bear $C_1$-$C_4$-alkyl groups as substituents or $C_3$-$C_{10}$-cycloalkyl, v is 1 or when $A^{1B}$ is an unsubstituted, substituted or fused, heterocyclic ring system may also be 0 or where the radicals $R^{4B}$ and $R^{12B}$ together form an -$R^{15B}$- group.

$A^{1B}$ can, for example together with the bridge $R^{15B}$, form an amine, ether, thioether or phosphine. However, $A^{1B}$ can also be an unsubstituted, substituted or fused, heterocyclic aromatic ring system which can contain heteroatoms from the group consisting of oxygen, sulfur, nitrogen and phosphorus in addition to ring carbons. Examples of 5-membered heteroaryl groups which can contain from one to four nitrogen atoms and/or a sulfur or oxygen atom as ring members in addition to carbon atoms are 2-furyl, 2-thienyl, 2-pyrrolyl, 3-isoxazolyl, 5-isoxazolyl, 3-isothiazolyl, 5-isothiazolyl, 1-pyrazolyl, 3-pyrazolyl, 5-pyrazolyl, 2-oxazolyl, 4-oxazolyl, 5-oxazolyl, 2-thiazolyl, 4-thiazolyl, 5-thiazolyl, 2-imidazolyl, 4-imidazolyl, 5-imidazolyl, 1,2,4-oxadiazol-3-yl, 1,2,4-oxadiazol-5-yl, 1,3,4-oxadiazol-2-yl and 1,2,4-triazol-3-yl. Examples of 6-membered heteroaryl groups which may contain from one to four nitrogen atoms and/or a phosphorus atom are 2-pyridinyl, 2-phosphabenzenyl, 3-pyridazinyl, 2-pyrimidinyl, 4-pyrimidinyl, 2-pyrazinyl, 1,3,5-triazin-2-yl and 1,2,4-triazin-3-yl, 1,2,4-triazin-5-yl and 1,2,4-triazin-6-yl. The 5-membered and 6-membered heteroaryl groups may also be substituted by $C_1$-$C_{10}$-alkyl, $C_6$-$C_{10}$-aryl, alkylaryl having from 1 to 10 carbon atoms in the alkyl part and 6-10 carbon atoms in the aryl part, trialkylsilyl or halogens such as fluorine, chlorine or bromine or be fused with one or more aromatics or heteroaromatics. Examples of benzo-fused 5-membered heteroaryl groups are 2-indolyl, 7-indolyl, 2-coumaronyl, 7-coumaronyl, 2-thionaphthenyl, 7-thionaphthenyl, 3-indazolyl, 7-indazolyl, 2-benzimidazolyl and 7-benzimidazolyl. Examples of benzo-fused 6-membered heteroaryl groups are 2-quinolyl, 8-quinolyl, 3-cinnolyl, 8-cinnolyl, 1-phthalazyl, 2-quinazolyl, 4-quinazolyl, 8-quinazolyl, 5-quinoxalyl, 4-acridyl, 1-phenanthridyl and 1-phenazyl. Naming and numbering of the heterocycles has been taken from L. Fieser and M. Fieser, Lehrbuch der organischen Chemie, 3$^{rd}$ revised edition, Verlag Chemie, Weinheim 1957.

The radicals $X^B$ in the general formula (III) are preferably identical, preferably fluorine, chlorine, bromine, $C_1$-$C_7$-alkyl or aralkyl, in particular chlorine, methyl or benzyl.

The synthesis of such complexes can be carried out by methods known per se, with the reaction of the appropriately substituted cyclic hydrocarbon anions with halides of hafnium being preferred. Examples of appropriate preparative methods are described, for example, in Journal of Organometallic Chemistry, 369 (1989), 359-370.

The hafnocenes can be used in the Rac or pseudo-Rac form. The term pseudo-Rac refers to complexes in which the two cyclopentadienyl ligands are in the Rac arrangement relative to one another when all other substituents of the complex are disregarded.

Examples of suitable hafnocenes are, inter alia, methylenebis(cyclopentadienyl)hafnium dichloride, methylenebis(3-methylcyclopentadienyl) hafnium dichloride, methylenebis(3-n-butylcyclopentadienyl)hafnium dichloride, methylene-bis(indenyl)hafnium dichloride, methylenebis(tetrahydroindenyl) hafnium dichloride, isopropylidene-bis(cyclopentadienyl)hafnium dichloride, isopropylidenebis(3-trimethylsilylcyclopentadienyl)hafnium dichloride, isopropylidenebis(3-methylcyclopentadienyl)hafnium dichloride, isopropylidenebis(3-n-butylcyclopentadienyl) hafnium dichloride, isopropylidenebis(3-phenylcyclopentadienyl)hafnium dichloride, isopropylidenebis(indenyl) hafnium dichloride, isopropylidenebis(tetrahydroindenyl) hafnium dichloride, dimethylsilanediylbis(cyclopentadienyl)hafnium dichloride, dimethylsilanediylbis(indenyl)hafnium dichloride, dimethylsilanediylbis(tetrahydroindenyl)hafnium dichloride, ethylenebis(cyclopentadienyl)hafnium dichloride, ethylenebis(indenyl)hafnium dichloride, ethylenebis(tetrahydroindenyl) hafnium dichloride, tetramethylethylene-9-fluorenyl-cyclopentadienylhafnium dichloride, dimethylsilanediylbis (tetramethylcyclopentadienyl)hafnium dichloride, dimethylsilanediylbis(3-trimethylsilylcyclopentadienyl) hafnium dichloride, dimethylsilanediylbis(3-methylcyclopentadienyl)hafnium dichloride, dimethylsilanediylbis(3-n-butylcyclopentadienyl)hafnium dichloride, dimethylsilanediylbis(3-tert-butyl-5-methylcyclopentadienyl)hafnium dichloride, dimethylsilanediylbis(3-tert-butyl-5-ethylcyclopentadienyl)hafnium dichloride, dimethylsilanediylbis(2-methylindenyl)hafnium dichloride, dimethylsilanediylbis(2-isopropylindenyl)hafnium dichloride, dimethylsilanediylbis(2-tert-butylindenyl)hafnium dichloride, diethylsilanediylbis(2-methylindenyl)hafnium dibromide, dimethylsilanediylbis(3-methyl-5-methylcyclopentadienyl)hafnium dichloride, dimethylsilanediylbis(3-ethyl-5-isopropylcyclopentadienyl)hafnium dichloride, dimethylsilanediylbis(2-ethylindenyl)hafnium dichloride, dimethylsilanediylbis(2-methyl-4,5-benzindenyl)hafnium dichloride, dimethylsilanediylbis(2-ethyl-4,5-benzindenyl) hafnium dichloride, methylphenylsilanediylbis(2-methyl-4,5-benzindenyl)hafnium dichloride, methylphenylsilanediyl-bis(2-ethyl-4,5-benzindenyl)hafnium dichloride, diphenylsilanediylbis(2-methyl-4,5-benzindenyl)hafnium dichloride, diphenylsilanediylbis(2-ethyl-4,5-benzindenyl) hafnium dichloride, diphenylsilanediylbis(2-methylindenyl)

hafnium dichloride, dimethylsilanediylbis(2-methyl-4-phenylindenyl)hafnium dichloride, dimethylsilanediylbis(2-ethyl-4-phenylindenyl)hafnium dichloride, dimethylsilanediylbis(2-methyl-4-(1-naphthyl)indenyl) hafnium dichloride, dimethylsilanediylbis(2-ethyl-4-(1-naphthyl)indenyl)hafnium dichloride, dimethylsilanediylbis (2-propyl-4-(1-naphthyl)indenyl)hafnium dichloride, dimethylsilanediylbis(2-i-butyl-4-(1-naphthyl)indenyl) hafnium dichloride, dimethylsilanediylbis(2-propyl-4-(9-phenanthryl)indenyl)hafnium dichloride, dimethylsilanediylbis(2-methyl-4-isopropylindenyl)hafnium dichloride, dimethylsilanediylbis(2,7-dimethyl-4-isopropylindenyl)hafnium dichloride, dimethylsilanediylbis(2-methyl-4,6-diisopropylindenyl)hafnium dichloride, dimethylsilanediylbis(2-methyl-4[p-trifluoromethylphenyl]indenyl) hafnium dichloride, dimethylsilanediylbis(2-methyl-4-[3',5'-dimethylphenyl]indenyl)hafnium dichloride, dimethylsilanediylbis(2-methyl-4-[4'-tert-butyl-phenyl]indenyl)hafnium dichloride, diethylsilanediylbis(2-methyl-4-[4'-tert-butylphenyl]indenyl)hafnium dichloride, dimethylsilanediylbis(2-ethyl-4-[4'-tert-butylphenyl]indenyl)hafnium dichloride, dimethylsilanediylbis(2-propyl-4-[4'-tert-butyl-phenyl]indenyl)hafnium dichloride, dimethylsilanediylbis (2-isopropyl-4-[4'-tert-butylphenyl]indenyl)hafnium dichloride, dimethylsilanediylbis(2-n-butyl-4-[4'-tert-butylphenyl]indenyl)hafnium dichloride, dimethylsilanediylbis(2-hexyl-4-[4'-tert-butylphenyl]indenyl)hafnium dichloride, dimethylsilanediyl(2-isopropyl-4-phenylindenyl)(2-methyl-4-phenylindenyl)hafnium dichloride, dimethylsilanediyl(2-isopropyl-4-(1-naphthyl)indenyl)(2-methyl-4-(1-naphthyl) indenyl)hafnium dichloride, dimethylsilanediyl(2-isopropyl-4-[4'-tert-butylphenyl]indenyl)(2-methyl-4-[4'-tert-butylphenyl]indenyl)hafnium dichloride, dimethylsilanediyl (2-isopropyl-4-[4'-tert-butylphenyl]indenyl)(2-ethyl-4-[4'-tert-butylphenyl]indenyl)hafnium dichloride, dimethylsilanediyl(2-isopropyl-4-[4'-tert-butylphenyl]-indenyl)(2-methyl-4-[3',5'-bis-tert-butylphenyl]indenyl) hafnium dichloride, dimethylsilanediyl(2-isopropyl-4-[4'-tert-butylphenyl]indenyl)(2-methyl-4-[1'-naphthyl]indenyl) hafnium dichloride and ethylene(2-isopropyl-4-[4'-tert-butylphenyl] indenyl)(2-methyl-4-[4'-tert-butylphenyl] indenyl)-hafnium dichloride, and also the corresponding dimethylhafnium, monochloromono(alkylaryloxy)-hafnium and di(alkylaryloxy)hafnium compounds. The complexes can be used in the rac form, the meso form or as mixtures of these.

Among the hafnocenes of the above-mentioned general formula, those of the following formula (V)

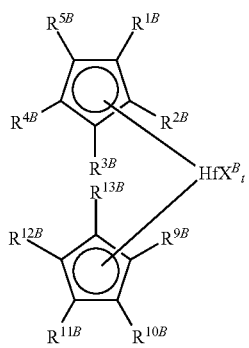

are preferred.

Among the compounds of formula (V), preference is given to those in which $X^b$ is fluorine, chlorine, bromine, $C_1$-$C_4$-alkyl or benzyl, or two radicals $X^B$ form a substituted or unsubstituted butadiene ligand, t is 1 or 2, preferably 2, $R^{1B}$ to $R^{5B}$ are each hydrogen, $C_1$-$C_8$-alkyl, $C_6$-$C_8$-aryl, $NR^{8B}_2$, $OSiR^{8B}_3$ or $Si(R^{8B})_3$ and $R^{9B}$ to $R^{13B}$ are each hydrogen, $C_1$-$C_8$-alkyl or $C_6$-$C_8$-aryl, $NR^{14B}_2$, $OSiR^{14B}_3$ or $Si(R^{14B})_3$ or in each case two radicals $R^{1B}$ to $R^{5B}$ and/or $R^{9B}$ to $R^{13B}$ together with the $C_5$ ring form an indenyl, fluorenyl or substituted indenyl or fluorenyl system.

The hafnocenes of the formula (V) in which the cyclopentadienyl radicals are identical are particularly useful.

Examples of particularly suitable compounds of the formula (V) are, inter alia:

bis(cyclopentadienyl)hafnium dichloride, bis(indenyl) hafnium dichloride, bis(fluorenyl)hafnium dichloride, bis(tetrahydroindenyl)hafnium dichloride, bis(pentamethylcyclopentadienyl)hafnium dichloride, bis (trimethylsilylcyclopentadienyl)hafnium dichloride, bis (trimethoxysilylcyclopentadienyl)hafnium dichloride, bis (ethylcyclopentadienyl)hafnium dichloride, bis (isobutylcyclopentadienyl)hafnium dichloride, bis(3-butenylcyclopentadienyl)hafnium dichloride, bis (methylcyclopentadienyl)hafnium dichloride, bis(1,3-di-tert-butylcyclopentadienyl)hafnium dichloride, bis (trifluoromethylcyclopentadienyl)hafnium dichloride, bis (tert-butylcyclopentadienyl)hafnium dichloride, bis(n-butylcyclopentadienyl)hafnium dichloride, bis (phenylcyclopentadienyl)hafnium dichloride, bis(N,N-dimethylaminomethylcyclopentadienyl)hafnium dichloride, bis(1,3-dimethyl-cyclopentadienyl)hafnium dichloride, bis (1-n-butyl-3-methylcyclopentadienyl)hafnium dichloride, (cyclopentadienyl)(methylcyclopentadienyl)hafnium dichloride, (cyclopentadienyl)(n-butylcyclopentadienyl) hafnium dichloride, (methylcyclopentadienyl)(n-butylcyclopentadienyl)hafnium dichloride, (cyclopentadienyl)(1-methyl-3-n-butylcyclopentadienyl)hafnium dichloride, bis (tetramethylcyclopentadienyl)hafnium dichloride and also the corresponding dimethylhafnium compounds.

Further examples are the corresponding hafnocene compounds in which one or two of the chloride ligands have been replaced by bromide or iodide.

Further suitable metallocenes may be those based on the formulae (III) or (V), where, instead of hafnium, a different transition metal selected form the group consisting of early transition metal compounds is provided, such as for examples Ti, Zr, V, Cr.

By way of illustrative example, the mixed catalyst system preferably comprises at least one metallocene as single site catalyst component (B) (e.g. hafnocene or zirconocene) and at least one transition metal compounds of the non-metallocene type as non single site catalyst component (A), preferably a late transition metal, more preferably an iron catalyst component, preferably having a tridentate ligand bearing at least two aryl radicals, each bearing a halogen and/or alkyl substituent.

Preferably, the first olefin polymerization reaction is performed in the presence of a first predetermined concentration of at least one auxiliary agent, such as for example an antistatic agent.

Preferably, the second olefin polymerization is performed in the presence of a second predetermined concentration of auxiliary agent, said second predetermined concentration being from 0 to a value lower than said first predetermined concentration.

Preferably, the third olefin polymerization reaction is performed in the presence of a third predetermined concentration of auxiliary agent, said third predetermined concentration being from 0 to a value lower than said second predetermined concentration.

Preferably, the first olefin polymerization reaction is performed in the presence of a first predetermined concentration of molar mass regulator, preferably hydrogen, preferably higher than 2 ppm, preferably higher than 3 ppm, preferably from 4 to 8 ppm.

Preferably, the second olefin polymerization reaction is performed in the presence of a second predetermined concentration of molar mass regulator, preferably lower than said first predetermined concentration of molar mass regulator, preferably lower than 1 ppm, preferably lower than 0.1 ppm.

Preferably, the third olefin polymerization reaction is performed in the presence of a third predetermined concentration of molar mass regulator, preferably lower than said second concentration of molar mass regulator, preferably lower than 0.1 ppm. More preferably, the third olefin polymerization reaction is performed in the absence of molar mass regulator.

Preferably, the first olefin polymerization reaction is performed in the presence of a first predetermined concentration of a first antistatic agent, preferably from 10 to 600 ppm, more preferably from 10 to 400 ppm, more preferably from 20 to 200 ppm, more preferably from 30 to 150 ppm.

Preferably, the antistatic agent used in the first polymerization reaction (first antistatic agent) comprises an alkoxyamine (such as for example commercially available Atmer, for example Atmer163).

Preferably, the second olefin polymerization is performed in the presence of a second predetermined concentration of the first antistatic agent, preferably the same antistatic agent used in the first olefin polymerization, said second predetermined concentration being from to 0 to a value lower than said first predetermined concentration. Preferably, the second predetermined concentration of the first antistatic agent in the second polymerization reaction is from 5 to 50 ppm, more preferably from 5 to 40 ppm, more preferably from 5 to 30 ppm, more preferably from 5 to 20 ppm, more preferably from 5 to 15 ppm, and in any case lower than said first predetermined concentration. Alternatively, the second olefin polymerization is performed in the absence of the first antistatic agent.

Preferably, the third olefin polymerization reaction is performed in the presence of a third predetermined concentration of the first antistatic agent, preferably the same antistatic agent used in the first olefin polymerization, said third predetermined concentration being from to 0 to a value lower than said first predetermined concentration. Said third predetermined concentration of the first antistatic agent in the third polymerization reaction is preferably from to 0 to a value lower than said first predetermined concentration and preferably lower than said second predetermined concentration, preferably from 0 to 10 ppm, more preferably from 0 to 5 ppm, preferably from 0.3 to 5 ppm.

Preferably, the third olefin polymerization reaction is performed in the absence of the first antistatic agent.

Preferably, the second olefin polymerization is performed in the presence of a predetermined concentration of a second antistatic agent different from said first antistatic agent, preferably commercially available Costelan AS100, preferably at a concentration from 0 to 100 ppm, preferably from 5 to 50 ppm, preferably from 6 to 20 ppm.

Preferably, the third olefin polymerization is performed in the presence of a predetermined concentration of a second antistatic agent, preferably the same antistatic agent used in the second polymerization reaction, preferably at a concentration lower than the concentration used in the second polymerization reaction, preferably at a concentration from 0 to 80 ppm, preferably from 2 to 20 ppm, preferably from 3 to 10 ppm.

Preferably, the first polymerization reaction is performed in the presence of a first predetermined concentration of an agent activating the Ziegler-Natta catalyst component, preferably comprising an organometallic compound, preferably an organometallic compound, preferably an organometallic compound of a metal of Group 1, 2 or 3. Preferably, the first activating agent is selected from the group comprising, preferably consisting of: organometallic alkyls, alkoxides, and halides.

Preferably, said first predetermined concentration of agent activating the Ziegler-Natta catalyst component is higher than 15 ppm, preferably from 20 ppm to 500 pm, more preferably from 30 to 400 ppm, more preferably from 60 to 400 ppm.

Preferably, the second polymerization reaction is performed in the presence of a second predetermined concentration of said agent activating the Ziegler-Natta catalyst component, preferably lower than said first predetermined concentration, preferably lower than 30 ppm, preferably lower than 20 ppm, preferably lower than 15 ppm, preferably lower than 10 ppm. More preferably, the second polymerization reaction is performed in the absence of a said agent activating the Ziegler-Natta catalyst component.

Preferably, the third polymerization reaction is performed in the presence of a third predetermined concentration of said agent activating the Ziegler-Natta catalyst component, preferably lower than said first predetermined concentration, preferably lower than 30 ppm, preferably lower than 25 ppm, preferably lower than 15 ppm, preferably lower than 10 ppm. More preferably, the third polymerization reaction is performed in the absence of a said agent activating the Ziegler-Natta catalyst component.

According to the method of invention, as mentioned above, the first olefin polymerization reaction, which is performed in the presence of the Ziegler-Natta catalyst system, is discontinued (step a)).

This discontinuing step a) is preferably performed by carrying out the steps of:

a1) interrupting a feeding of the Ziegler-Natta catalyst system into the reactor; and
a2) deactivating the Ziegler-Natta catalyst system, preferably in an irreversible manner.

Preferably, the step a2) of deactivating the Ziegler-Natta catalyst system is performed by feeding into the reactor an agent deactivating the Ziegler-Natta catalyst system, preferably an irreversible deactivating agent.

For the purposes of the present invention, any deactivating agent comprising substances or mixtures of substances which are able to react with at least one of the components of the Ziegler-Natta catalyst system so as to make the Ziegler-Natta catalyst system inactive, preferably irreversibly inactive, can be used.

Preference is given to deactivating agents irreversibly deactivating the Ziegler-Natta catalyst system, i.e. agents irreversibly inactivating the catalyst ability to polymerize the monomer(s), i.e. such that no reactivation of the Ziegler-Natta catalyst system can be observed even when the deactivating agent is removed or an activating agent (cocatalyst) is fed.

Preferably, the deactivating agent is selected from the group comprising, preferably consisting of: CO, $CO_2$, oxygen, water, alcohols, glycols, phenols, ethers, carbonyl compounds such as ketones, aldehydes, carboxylic acids, esters, fatty acids, alkynes such as acetylene, amines, alkoxyamines (such as for example commercially available Atmer), nitriles, nitrous compounds, pyridine, pyroles, carbonylsulfide, mercaptans, antistatic agents (such as for example Costelan AS100, available from Costenoble, Germany).

Preferably, the agent deactivating the Ziegler-Natta catalyst system is selected from the group comprising, preferably consisting of: oxygen, water, alcohols, glycols, phenols, carbon monoxide, carbon dioxide, ethers, carbonyl compounds, alkynes, nitrous compounds.

The first olefin polymerization reaction is preferably discontinued by feeding an alcohol, as described in more details in the following, or CO, $CO_2$, lean air, i.e. air which has a reduced proportion of oxygen.

Preferably, in the preferred embodiment according to which the reactor is gas phase reactor, in particular a gas-phase fluidized-bed reactor, the agent deactivating the Ziegler-Natta catalyst system is volatile under polymerization conditions.

For the purposes of the present invention, a volatile deactivating agent is a substance or a mixture of substances having a vapor pressure of above 1000 Pa under the conditions in the recycle gas system of the gas phase reactor. The vapor pressure is preferably sufficiently high to ensure complete deactivation of the catalyst present in the recycle gas system. Preference is given to a vapor pressure of above 1500 Pa, preferably above 2000 Pa, at 20° C. Preference is also given to a volatile deactivating agent having a boiling point below the temperature in the gas-phase fluidized-bed reactor under polymerization conditions, so that it vaporizes completely in the reactor.

Particularly suitable volatile deactivating agents are for example low molecular weight alcohols and their ethers, low molecular weight esters and amines having a sufficient vapor pressure for them to be able to be present in gaseous form in a sufficient amount under the usual polymerization conditions and preferably also under the conditions in the recycle gas system. Preference is given to the $C_1$-$C_4$-alcohols methanol (b.p.: 65° C., 128 hPa), ethanol (78° C., 60 hPa), 1-propanol (97.4° C., 18.7 hPa), 2-propanol (82° C., 43 hPa), 1-butanol (117° C., 6.7 hPa), 2-butanol (99° C., 17 hPa), tert-butanol (82.2° C., 41.3 hPa), with the values given in brackets being the boiling point and the vapor pressure, respectively, at 20° C. Preference is also given to the $C_2$-$C_6$-ethers. Particular preference is given to 2-propanol.

In addition to the deactivating agent, the use of further auxiliaries such as antistatics, scavengers, etc., is possible. To improve the facility to meter the deactivating agent, the latter can comprise inert solvents, for example saturated hydrocarbons such as hexane.

The amount of deactivating agent used is dependent on the size and geometry of the reactor. It is possible, for example, to start with a small amount and increase it until complete deactivation has taken place.

Furthermore, preference is given to a deactivating agent having an antistatic action.

According to a preferred embodiment thereof, the deactivating agent is metered in excess.

According to a preferred embodiment, the step a) of discontinuing the first olefin polymerization reaction in a reactor is performed by carrying out the steps of:

a1) interrupting the feeding of Ziegler-Natta catalyst system into the reactor; and a2) increasing the reactor temperature.

Preferably, the reactor temperature is increased of about 10-20° C. with respect to the temperature at which the first olefin polymerization reaction is carried out. By way of an illustrative example, if the first olefin polymerization reaction is carried out at about 70° C.-110° C., then, after interrupting the feeding of the first catalyst system into the reactor, the reactor temperature is preferably set to about 80° C.-120° C., more preferably to about 90° C.-115° C., and in any case to a temperature higher than that of the first olefin polymerization reactor so as to deactivate the Ziegler-Natta catalyst system.

In order to deactivate the Ziegler-Natta catalyst system, the use of a deactivating agent and a temperature increase or reduction, depending on the nature of the mixed catalyst systems, can be also combined, so as to advantageously reduce, on the one side, the amount of deactivating agent and, on the other side, the temperature increase or decrease.

The step a) of discontinuing the first olefin polymerization reaction, the step b) of performing the second polymerization reaction and the step c) of performing the third polymerization reaction as defined above are preferably performed in a continuous manner, i.e. without any intermediate step therebetween, in particular without any step of emptying reactor or, with reference for example to the preferred embodiment envisaging a fluidized bed reactor, of reducing the height of the bed. In other words, when the reactor is a fluidized-bed reactor, step b) can be carried out after step a) and step c) can be carried out after step b) while retaining the particle bed present in the reactor.

According to an alternative embodiment, after step a) and before step b) the particle bed mass is preferably lowered. In this way, the amount of deactivating agent needed to deactivate the Ziegler-Natta catalyst system may be advantageously reduced.

When an agent deactivating the Ziegler-Natta catalyst system is used, the method preferably further comprises the step of neutralizing the excess of deactivating agent.

Preferably, the step of neutralizing the excess of deactivating agent is carried out by using a scavenger.

Preferably, the step of neutralizing the excess of deactivating agent is carried out by feeding a neutralizing agent into the reactor, preferably an organometallic compound, more preferably an organometallic compound of a metal of Group 1, 2 or 3, more preferably an organometallic alkyl, more preferably an organoaluminum compound.

Preferably, the organometallic compound is selected from the group comprising, preferably consisting of: lithium alkyls, magnesium or zinc alkyls, magnesium alkyl halides, aluminum alkyls, silicon alkyls, silicon alkoxides and silicon alkyl halides. More preferably, the organometallic compounds are aluminum alkyls and magnesium alkyls. Still more preferably, the organometallic compounds are aluminum alkyls, preferably trialkylaluminum compounds. Preferably, the aluminum alkyls are, for example, trimethylaluminum (TMAL), triethylaluminum (TEAL), triisobutylaluminum (TIBAL) and tri-n-hexylaluminum (TNHAL) and the like.

Preferably, the step of neutralizing the excess of deactivating agent is carried out by the same compound used as an agent activating the first catalyst component of the mixed catalyst system, which is preferably an organometallic compound, preferably an organoaluminum compound.

The further olefin polymerization reaction is performed with an initial activity of catalyst component (A) exceeding the initial activity of catalyst component (B), i.e. for a predetermined time.

This predetermined time preferably depends on the difference in the molecular weights attainable by the catalyst components of the mixed catalyst system. The predetermined time is preferably the time at which a predetermined average molecular weight, preferably of about 80000, is achieved. Once the predetermined molecular weight is achieved, the relative activity of the two catalyst components (A) and (B) can be freely adjusted depending on the type of the target polyolefin. In other words, once a predetermined average molecular weight is achieved, the further olefin polymerization reaction can be continued and the relative activity between the two catalyst components (A) and (B) of the mixed catalyst system may be adjusted in a different manner when compared to the initial conditions, preferably so as to ensure the maximum activity of both catalyst components or any desired ratio between their activities which ensures a desired targeted product.

The relative activity between the two catalyst components of the mixed catalyst system may be adjusted by changing the conditions affecting the activity of at least one of the catalyst components of the mixed catalyst system, such as for example physical conditions (e.g. temperature, pressure) or chemical conditions.

According to a preferred embodiment, the second olefin polymerization reaction is initially performed in the presence of an agent reversibly deactivating catalyst component (B) of the mixed catalyst system.

Preferably, the agent reversibly deactivating catalyst component (B) of the mixed catalyst system derives from the reaction between the agent deactivating the Ziegler-Natta catalyst system and the neutralizing agent.

According to an alternative embodiment, the second olefin polymerization reaction is initially performed in the presence of an agent activating catalyst component (A) of the mixed catalyst system.

There are a number of ways to carry out step b) which are within the skills of the man skilled in the art. In principle, any way leading to an initial prevailing activity of catalyst component (A) of the mixed catalyst system (i.e. an activity exceeding the activity of second catalyst component (B)) may achieve the object of the invention. Catalyst component (A) is relatively more active when compared to catalyst component (B) of the mixed catalyst system, for example, by introducing into the reactor an agent activating catalyst component (A) but substantially not acting on the activity of catalyst component (B), by introducing into the reactor an agent activating more catalyst component (A) than catalyst component (B), by introducing into the reactor an agent deactivating catalyst component (B), or by initially setting any polymerization conditions favoring an initial prevailing activity of catalyst component (A).

If the polymerization reactions are carried out in gas phase, the method preferably further comprises the step of adjusting the gas composition after carrying out step a2), preferably before carrying out step b) and, optionally, once again before carrying out step c).

Preferably, the method further comprises the step of reducing the bed height after the first polymerization reaction.

In this way, it is advantageously possible either to minimize the amount of the deactivating agent or to further reduce the time for transitioning from the first to the second olefin polymerization reaction.

Preferably, after the step b) of performing the second olefin polymerization reaction and before the step c) of performing the third olefin polymerization reaction, the temperature is set in a range from 100 to 125° C., more preferably from 110 to 120° C.

Preferably, before carrying out the step c), the reactor temperature is maintained substantially at the same value of step b), preferably increased of about 5-15° C., preferably of 8-12° C. with respect to the temperature at which the second olefin polymerization reaction is carried out. By way of an illustrative example, if the second olefin polymerization reaction is carried out at about 100° C., then, after interrupting the feeding of the mixed catalyst system into the reactor, the reactor temperature is preferably set to a temperature higher than 100° C. so as to deactivate the mixed catalyst system, preferably to about 105° C., more preferably to about 110° C.

Preferably, after the step b) of performing the second olefin polymerization reaction and before the step c) of performing the third olefin polymerization reaction, optionally in combination with the above-mentioned preferred adjustment of the temperature, the gas composition is adjusted, preferably decreasing the comonomer and hydrogen concentration.

Preferably, the method further comprises the step of reducing the bed height after the second polymerization reaction.

In this way, it is advantageously possible either to further reduce the time for transitioning from the second to the third olefin polymerization reaction.

It is also possible to envisage a transitioning from a Phillips catalyst system to a mixed catalyst system, preferably selected among any of the preferred mixed catalyst systems mentioned above. This transitioning can be performed either alone or in sequence after step c) of the method of the invention, thus permitting a fourth olefin polymerization. In both cases, it is convenient to perform the corresponding olefin polymerization in the presence of the mixed catalyst and of an antistatic agent, preferably selected among the antistatic agents mentioned above, at a concentration higher than the concentration of the antistatic agent used during the polymerization performed in the presence of the Phillips catalyst system. Accordingly, the method for transitioning from the Phillips catalyst system to the mixed catalyst system preferably comprises the step of increasing the concentration of antistatic agent. Preferably, the optional fourth olefin polymerization is performed in the presence of a fourth predetermined concentration of antistatic agent, said fourth predetermined concentration being from 5 to 15 ppm, more preferably from 8 to 12 ppm, in any case higher than said third predetermined concentration.

The present invention is illustrated below with the aid of examples, without being restricted thereto.

EXAMPLES

The examples illustrate a preferred embodiment of the invention referring to the preparation of a polymer in a continuous gas phase fluidized bed reactor. Here the transitioning from a Ziegler-Natta catalyst system to a Phillips catalyst system through an intermediate use of a mixed catalyst system comprising a non-metallocene late transition metal catalyst component and a metallocene component is described. More particularly, a first polymerization reaction of ethylene as monomer with hexene as comonomer was performed in a gas-phase fluidized-bed reactor having an output of 55 kg/h. Subsequently, in the same reactor a second polymerization reaction of ethylene as monomer with hexene as comonomer was performed. Subsequently, in the same reactor a third polymerization reaction of ethylene as monomer with hexene as comonomer was performed. The first polymerization reaction was performed using the following Ziegler-Natta catalyst system, the second polymerization reaction was performed using the following mixed catalyst system, the third polymerization reaction was performed using the following Phillips catalyst system.

Example 1

Ziegler-Natta Catalyst System

As first catalyst system, A Ziegler-Natta catalyst system comprising Avant Z218-1, commercially available from LyondellBasell, as catalyst component and tri-isobutyl aluminum as activating agent (TIBAL, 10 wt % solution in hexane) was used.

Example 2

Mixed Catalyst System

As mixed catalyst system, a mixed catalyst system based on an iron-bisimine complex as non-metallocene component and on a hafnocene as metallocene component as described in the following was used.

As a pretreatment of the support, Sylopol 2326®, a spray-dried silica gel from Grace, was calcinated at 600° C. for 6 h.

2,6-Bis[1-(2-chloro-4,6-dimethylphenylimino)ethyl]pyridine was prepared as described in example 2 of WO 98/27124 and was used to synthesize 2,6-diacetylpyridinbis(2-dichloro-4,6-dimethylphenylanil) iron dichloride by using iron(II)chloride as described in example 8 of WO 98/27124.

Bis(n-butylcyclopentadienyl)hafnium dichloride [M=491.84 g/mol] was purchased from Crompton, Bergkamen.

A mixture of 6.77 g (11.98 mmol) of 2,6-diacetylpyridinbis(2-chloro-4,6-dimethylphenylanil) iron dichloride prepared as above, and 82.67 g (127.3 mmol) of bis(n-butylcyclopentadienyl)hafnium dichloride and 5.31 l MAO (4.75 M in toluene, 25.2 mol, commercially available from Albemarle) were stirred at ambient temperature for 60 min and subsequently, while stirring, added to 2400 g of the support pretreated as described in a) at 0° C. Additionally 5.5 l toluene was added via the feedline. The solution was further stirred at 20° C. for additional 2 hours (ratio (ΣFe+Hf):Al=1:140). After filtration a washing step followed by using 4.5 l heptane. Filtration was performed at 3 bar nitrogen pressure as maximum value. The product was predried for 30 minutes in a nitrogen stream. The main drying step was performed at 35° C. in vacuum by using nitrogen as carrier gas. The vacuum was kept at about 100 mbar under reduced stirring (5-10 U/min). The free flowing powder was finally sieved (sieve: 240 μm).

5.1 Kg catalyst was obtained.

Example 3

Phillips Catalyst System

As Phillips catalyst system, a chromium catalyst system comprising Avant C220, commercially available from LyondellBasell, as catalyst component and tri-hexyl aluminum as activating agent (THA, 2 wt % solution in hexane) was used.

Example 4

First Polymerization Reaction Using the Ziegler-Natta Catalyst System

Feed streams of ethylene, hydrogen, propane and butene were introduced into the recycle gas line. The catalyst system of Example 1 was used.

The Ziegler-Natta catalyst component was introduced into the reactor via a precontacting vessel. Liquid propane and TIBAL were also fed continuously to the vessel. The flow rates of ethylene, hydrogen and butene were controlled to maintain gas composition target values. The concentrations of all gases were measured by an online gas chromatograph. The feed rate of the catalyst was adjusted to maintain the production rate. A superficial gas velocity was kept at 0.45 m/s to keep the reactor in a fluidized state. The reactor was operated at a pressure of 25 bar and at a temperature of the reactor exit at 80° C. The bed mass was kept substantially constant by removing discontinuously product from the reactor. The product was discharged into a discharge vessel and the gases were recycled back to the reactor via the recycle gas line. The product was purged by nitrogen to remove the hydrocarbons and treated with humidified nitrogen to deactivate the catalyst residue.

In this way, a polymer with MFR (190° C./5 kg) of 2 and density of 0.945 g/cm$^3$ was produced.

The conditions set at steady state are shown in Table 1.

TABLE 1

| | |
|---|---|
| $C_2H_4$ | 10 mol % |
| $H_2$ | 6 mol % |
| Propane | 83 mol % |
| butene | 1 mol % |
| TIBAL | 363 ppm |
| Atmer163 | 50 ppm |
| Bed weight | 140 Kg |
| Reactor temperature | 80° C. |
| Reactor pressure | 25 Bar |
| Production rate | 55 kg/h |
| Productivity | 5500 g/g |
| MFR (190° C./5 kg) | 2 g/10 min |
| Density | 0.945 g/cm$^3$ |
| Bulk density | 440 kg/m$^3$ |

Example 5

Transitioning from the First Polymerization Reaction to the Second Polymerization Reaction The first polymerization reaction carried out according to Example 4 was stopped by interrupting the feed of the first catalyst system, i.e. both of Avant Z218-1 and TIBAL, and by feeding, as an agent deactivating the first catalyst system, isopropanol. In order to reduce the amount of isopropanol to be used, before feeding the latter the bed level was dropped to a mass of 100 kg. Subsequently, 40 g of isopropanol was fed into the reactor in 2 hours time. Directly after starting the isopropanol feeding, the productivity decreased.

Subsequently, the reactor conditions were set to the target values shown in Table 2.

TABLE 2

| | |
|---|---|
| Temperature | 100° C. |
| Pressure | 25 bar |

Ethylene was set to 45 mol %, hydrogen to 0.06 mol % and hexene to 0.5 mol %. TIBAL feeding was started at 5 g/h, fed directly to the bed. After 2 hours, the mixed catalyst system of Example 2 was started to be fed at a rate of 8 g/h. The mixed catalyst system was fed also directly to the bed by using gaseous propane as carrier. The TIBAL feeding was reduced to 1 g/h. The feeding of the mixed catalyst was increased slowly with 2 g/h until a feeding rate of 16 g/h was reached. After 2 hours, the polymerization reaction could be detected. The production rate increased slowly. Samples were taken from the reactor every 3 hours. The melt index of the polymer increased rapidly up to value of MFR (190° C./2.16 kg) of 150 g/10 min, indicating that at this stage only the iron catalyst component was active. After about 6 hours of polymerization the melt index started to drop. Moreover, the hexene feeding to the plant to keep the target concentration increased steadily.

This means that now the hafnium component of the mixed catalyst system was increasing its activity. Hydrogen and hexene concentrations were adjusted to achieve the product target. 36 hours after the start of the mixed catalyst feeding the product was on target. The conditions set at steady state are shown in Table 3, the rest of the gas being nitrogen.

TABLE 3

| | |
|---|---|
| Temperature | 100° C. |
| Pressure | 25 bar |
| Ethylene | 45 mol % |
| Hydrogen | 0.06 mol % |
| Propane | 30 mol % |
| Hexane | 2 mol % |
| Butene | 0.05 mol % |
| Hexene | 0.30 mol % |
| Atmer163 | 12 ppm |
| Costelan AS100 | 12 ppm |
| Bed weight | 140 kg |
| Production rate | 48 kg/h |
| Productivity | 3000 g/g |
| TIBAL | 21 ppm |
| MFR (190° C./5 kg) | 8 g/10 min |
| Density | 0.952 |

Example 6

Transitioning from the Second Polymerization Reaction to the Third Polymerization Reaction The hydrogen concentration was increased to 0.1 mol %. The feeding of Atmer163 and TIBAL was stopped. Then the feeding of the mixed catalyst was stopped. The reactor continued to discharge polymer to keep the bed mass in the reactor. After 6 hours, the reactor conditions were adjusted to the target values shown in Table 4.

TABLE 4

| | |
|---|---|
| Temperature | 112° C. |
| Pressure | 25 bar |
| Ethylene | 54 mol % |
| Nitrogen | 43 mol % |
| Hexane | 2.5 mol % |
| Hydrogen | 0 mol % |
| Hexene | 0.25 mol % |

Trihexylaluminum (THA) feeding was started at 1 g/h, fed directly to the bed. After 2 hours, the Phillips catalyst system was started to be fed at a rate of 7 g/h. The Phillips catalyst system was fed also directly to the bed by using pressurized nitrogen as carrier. After 2 hours, the third polymerization reaction could be detected. Atmer163 feeding to the line between the reactor and the cyclone was started at a rate of 0.7 ppm. THA feeding was slowly reduced to 0.5 g/h. The production rate increased gradually. Samples were taken from the reactor every 3 hours. After about 12 hours of polymerization the melt index started to approach its target: MFR (190° C./21.6 kg)=13. The conditions set at steady state are shown in Table 5.

TABLE 5

| | |
|---|---|
| Temperature | 112° C. |
| Pressure | 25 bar |
| Ethylene | 54 mol % |
| Nitrogen | 43 mol % |
| Hexane | 2.5 mol % |
| Hydrogen | 0 mol % |

TABLE 5-continued

| | |
|---|---|
| Hexene | 0.27 mol % |
| Atmer163 | 0.7 ppm |
| Costelan AS100 | 5 ppm |
| Bed weight | 140 kg |
| Production rate | 50 kg/h |
| Productivity | 7000 g/g |
| THA concentration | 10 ppm |
| MFR (190° C./21.6 kg) | 13 g/10 min |
| Density | 0.937 |

In the present description and in the following claims, reference has been made to the following measuring methods.

Density is the polymer density in accordance with standard DIN EN ISO 1183-1:2004, method A (immersion).

The melt flow rate MFR (190/2.16) was determined according to DIN EN ISO 1133:2005, condition D at a temperature of 190° C. under a load of 2.16 kg.

The melt flow rate MFR (190/5) was determined according to DIN EN ISO 1133:2005, condition T at a temperature of 190° C. under a load of 5 kg.

The melt flow rate MFR (190/21.6) was determined according to DIN EN ISO 1133:2005, condition G at a temperature of 190° C. under a load of 21.6 kg.

$M_w$ is the weight average molar mass (weight average molecular weight) and $M_n$ is the number average molar mass (number average molecular weight). The determination of the molar mass $M_n$, $M_w$ was carried out by high-temperature gel permeation chromatography using a method described in DIN 55672-1:1995-02 issue Februar 1995. The deviations according to the mentioned DIN standard are as follows: Solvent 1,2,4-trichlorobenzene (TCB), temperature of apparatus and solutions 135° C. and as concentration detector a PolymerChar (Valencia, Paterna 46980, Spain) IR-4 infrared detector, capable for use with TCB. A WATERS Alliance 2000 equipped with the following precolumn SHODEX UT-G and separation columns SHODEX UT 806 M (3x) and SHODEX UT 807 connected in series was used. The solvent was vacuum distilled under nitrogen and was stabilized with 0.025% by weight of 2,6-di-tert-butyl-4-methylphenol. The flow rate used was 1 ml/min, the injection was 500 μl and polymer concentration was in the range of 0.01%<conc.<0.05% w/w. The molecular weight calibration was established by using monodisperse polystyrene (PS) standards from Polymer Laboratories (now Varian, Inc., Essex Road, Church Stretton, Shropshire, SY6 6AX, UK) in the range from 580 g/mol up to 11600000 g/mol and additionally Hexadecane. The calibration curve was then adapted to Polyethylene (PE) by means of the Universal Calibration method (Benoit H., Rempp P. and Grubisic Z., & in J. Polymer Sci., Phys. Ed., 5, 753(1967)). The Mark-Houwing parameters used herefore were for PS: $k_{PS}$=0.000121 dl/g, $α_{PS}$=0.706 and for PE $k_{PE}$=0.000406 dl/g, $α_{PE}$=0.725, valid in TCB at 135° C. Data recording, calibration and calculation was carried out using NTGPC_Control_V6.02.03 and NTG-PC_V6.4.24 (hs GmbH, Hauptstraβe 36, D-55437 Ober-Hilbersheim) respectively.

The invention claimed is:
1. A method for transitioning from a Ziegler-Natta catalyst system to a Phillips catalyst system for the polymerization of olefins in one reactor, said method comprising the steps of:
 a) discontinuing a first olefin polymerization reaction performed in the presence of the Ziegler-Natta catalyst system;
 b) performing a second olefin polymerization reaction in the presence of a further catalyst system comprising catalyst components (A) and (B) producing, respec- tively, a first and a second polyolefin fraction, wherein the $M_w$ of the first polyolefin fraction is less than the $M_w$ of the second polyolefin fraction and the initial activity of catalyst component (A) exceeds the initial activity of catalyst component (B); and c) performing a third olefin polymerization reaction in the presence of the Phillips catalyst system.

2. The method according to claim 1, wherein the first olefin polymerization reaction is performed in the presence of a first predetermined concentration of at least one auxiliary agent, and the second olefin polymerization is performed in the presence of a second predetermined concentration of auxiliary agent, said second predetermined concentration being from 0 to a value lower than said first predetermined concentration, and the third olefin polymerization reaction is performed in the presence of a third predetermined concentration of auxiliary agent, said third predetermined concentration being from 0 to a value lower than said second predetermined concentration.

3. The method according to claim 1, wherein step a) is carried out by the steps of:
  a1) interrupting a feeding of the Ziegler-Natta catalyst system into the reactor; and
  a2) deactivating the Ziegler-Natta catalyst system.

4. The method according to claim 3, wherein step a2) is carried out by feeding an agent deactivating the Ziegler-Natta catalyst system into the reactor.

5. The method according to claim 4, wherein the Ziegler-Natta catalyst system comprises a catalyst component and an agent activating the catalyst component, the agent activating the Ziegler-Natta catalyst comprising an organometallic compound of a metal of Group 1, 2 or 3.

6. The method according to claim 1, wherein catalyst component (A) of the further catalyst system comprises a late transition metal and catalyst component (B) of the further catalyst system is a metallocene.

7. The method according to claim 4, wherein said agent deactivating the first catalyst system is selected from the group comprising: oxygen, water, alcohols, glycols, phenols, carbon monoxide, carbon dioxide, ethers, carbonyl compounds, alkynes, or nitrous compounds.

8. The method according to claim 4, wherein said agent deactivating the Ziegler-Natta catalyst system is metered in excess, the method further comprising the step of neutralizing the excess of the agent deactivating the Ziegler-Natta catalyst system by feeding a neutralizing agent into the reactor.

9. The method according to claim 8 wherein the Ziegler-Natta catalyst system comprises a catalyst component and an agent activating the catalyst component, the agent activating the Ziegler-Natta catalyst comprising an organometallic compound of a metal of Group 1, 2 or 3, and the neutralizing agent is the same compound used as an agent activating the Ziegler-Natta catalyst system.

10. The method according to claim 8, wherein the second olefin polymerization reaction is initially performed in the presence of an agent reversibly deactivating catalyst component (B) of the further catalyst system.

11. The method according to claim 10, wherein the agent reversibly deactivating catalyst component (B) of the further catalyst system derives from the reaction between the agent deactivating the Ziegler-Natta catalyst system and the neutralizing agent.

12. The method according to claim 1, wherein the reactor is a gas phase reactor.

* * * * *